United States Patent
Mimori

(10) Patent No.: US 7,440,382 B2
(45) Date of Patent: Oct. 21, 2008

(54) OBJECTIVE OPTICAL ELEMENT WITH MULTIPLE DIFFRACTIVE SURFACES AND OPTICAL PICKUP DEVICE

(75) Inventor: Mitsuru Mimori, Kokubunji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 616 days.

(21) Appl. No.: 10/740,517

(22) Filed: Dec. 22, 2003

(65) Prior Publication Data
US 2004/0130804 A1   Jul. 8, 2004

(30) Foreign Application Priority Data
Dec. 26, 2002   (JP) ............................. 2002-377743

(51) Int. Cl.
*G02B 3/02* (2006.01)
(52) U.S. Cl. .................................. 369/112.08; 359/719
(58) Field of Classification Search ........................ None
See application file for complete search history.

(56) References Cited
U.S. PATENT DOCUMENTS

| | | | | |
|---|---|---|---|---|
| 6,124,988 A | * | 9/2000 | Yanagisawa et al. ........ 359/719 |
| 6,313,956 B1 | * | 11/2001 | Saito ........................... 359/721 |
| 6,952,390 B2 | * | 10/2005 | Mimori ................. 369/112.07 |
| 2001/0038597 A1 | * | 11/2001 | Shimozono ............ 369/112.26 |
| 2002/0131175 A1 | * | 9/2002 | Yagi et al. .................... 359/569 |

* cited by examiner

*Primary Examiner*—Joseph Feild
*Assistant Examiner*—Joseph Haley
(74) *Attorney, Agent, or Firm*—Finnegan, Henderson, Farabow, Garrett & Dunner, L.L.P.

(57) ABSTRACT

An objective optical element for use in an optical pickup apparatus comprises a first optical surface including a first diffractive structure which comprises a plurality of concentric ring-shaped diffractive zones having a center on the optical axis and stepped surfaces arranged to be almost parallel to the optical axis and connecting respective neighboring ring-shaped diffractive zones; and a second optical surface including a second diffractive structure which comprises a plurality of concentric ring-shaped diffractive zones having a center on the optical axis and stepped surfaces arranged to be almost parallel to the optical axis and connecting respective neighboring ring-shaped diffractive zones. The stepped surfaces of the first diffractive structure are arranged to face an optical axis side, and the stepped surfaces of the second diffractive structure are arranged to face an opposite side of the optical axis side.

21 Claims, 9 Drawing Sheets

※ CD (CONVENTIONAL EXAMPLE) REPRESENTS AN AMOUNT OF OFFENSE AGAINST THE SINE CONDITION OF CD INCLUDING AN AMOUNT OF OFFENSE AGAINST THE SINE CONDITION OF DVD AND AN AMOUNT OF WAVEFRONT ABERRATION FOR FIELD ANGLE

※ CD (CONVENTIONAL EXAMPLE) REPRESENTS AN AMOUNT OF OFFENSE AGAINST THE SINE CONDITION OF CD INCLUDING AN AMOUNT OF OFFENSE AGAINST THE SINE CONDITION OF DVD AND AN AMOUNT OF WAVEFRONT ABERRATION FOR SHIFT OF OBJECTIVE LENS

OBJECTIVE OPTICAL ELEMENT WITH MULTIPLE DIFFRACTIVE SURFACES AND OPTICAL PICKUP DEVICE

BACKGROUND OF THE INVENTION

The present invention relates to an objective optical element that converges a light flux on an information recording surface of an optical information recording medium and to an optical pickup device.

With practical use of a short wavelength red laser in recent years, there has been manufactured DVD (digital video disc) representing a high density optical information recording medium (which is also called an optical disc) which is the same as CD (a compact disc) in terms of a size and has a large capacity.

Further, in addition to the aforementioned CD and DVD, there have been commercialized optical discs in various standards each having a different wavelength of a light source and a different thickness of a protective base board such as, for example, CD-R, RW (write-once compact disc), VD (video disc), MD (mini-disc) and MO (magneto-optical disc).

Further, an attempt for the shorter wavelength of a semiconductor laser has been advanced, and research and development have been advanced for a high density optical disc (hereinafter referred to as "high density DVD") with a protective base board-thickness of 0.1 mm employing a violet laser semiconductor laser light source having a wavelength of about 400 nm and an objective lens in which the image-side numerical aperture (NA) is enhanced to about 0.85 and for high density DVD with a protective base board thickness of about 0.6 mm employing an objective lens whose image-side numerical aperture (NA) is about 0.65.

There have been proposed a various types of optical pickup devices each having the so-called compatibility to converge two types of light fluxes each having a different wavelength with a single objective lens on an information recording surface of each of two types of optical discs.

As an optical pickup device having compatibility, there is known an optical pickup device wherein a ring-shaped zonal or grid-shaped diffractive structure is formed on a surface of an objective lens and on a surface of an optical element arranged separately from the objective lens.

However, in the optical pickup device for compatibility provided with the diffractive structure of this kind, it has been difficult to satisfy sine conditions for correcting spherical aberration and wavefront aberration for both of DVD and CD and for correcting off-axial coma, even when utilizing diffracted ray by diffracting actions, because a thickness of a protective base board is not the same and a wavelength of a light flux to be used is not the same, for two types of optical information recording media (for example, DVD and CD).

As a cause for the foregoing, the diffracting action stated above is usually used to correct spherical aberration that is caused when each of two types of light fluxes used respectively for DVD and CD each being different in terms of wavelength passes through a refracting lens, and it is known that an angle (an angle of incidence and an angle of emergence) of a ray of light caused by the diffracting action is dependent on a pitch of the diffractive structure (see the following expression).

$n \times \sin \theta - n' \times \sin \theta' = m \times \lambda / P$ (n represents a refractive index of a medium on the incidence side, θ represents an angle of incidence, n' represents a refractive index of a medium on the emergence side, m represents an order of diffraction, λ represents a wavelength and P represents a pitch (diffraction pitch))

Further, a difference of an angle of emergence between DVD and CD is expressed by the following expression.

$-n'_{dvd} \times \sin \theta'_{dvd} - n'_{cd} \times \sin \theta'_{cd} = m \times d\lambda / P$ ($n'_{dvd}$ and $\sin \theta'_{dvd}$–$n'_{cd}$ represent respectively a refractive index and an angle of emergence of a medium on the emergence side in DVD, $n'_{cd}$ and $\sin \theta'_{cd}$ represent respectively a refractive index and an angle of emergence of a medium on the emergence side in CD, m represents an order of diffraction, dλ represents a difference of a light flux wavelength between DVD and CD and P represents a pitch (diffraction pitch))

Therefore, when a diffractive structure is formed only on an optical surface (plane of incidence) on one side of an objective lens, for example, diffraction pitch P necessary for correction of spherical aberration is determined by a difference of a thickness of a protective base board between DVD and CD and by a difference of a wavelength between two types of light fluxes. Therefore, a diffractive structure having a sufficient difference of an angle of a ray of light for correcting a sine condition is not obtained. Even if the sine condition is corrected sufficiently, there still remains a problem that correction of spherical aberration turns out to be insufficient or excessive.

Further, an optical pickup device wherein a diffractive structure is formed on each of a plane of incidence and a plane of emergence of an objective lens, for example, is also known (for example, see Patent Document 1).

In Patent Document 1, there is disclosed an optical pickup device wherein two surfaces of an objective lens including a plane of incidence and a plane of emergence are constructed to be a diffractive surface, and aberration is corrected for different wavelengths and different base board thicknesses by image forming ability in substantial diffraction limit shown by diffracted ray of the same order for two optical discs each having a different cover glass thickness and for two different wavelengths corresponding to the optical discs.

(Patent Document 1)
TOKKAI No. 2001-147367

(Problems to be Solved by the Invention)
However, the device disclosed in Patent Document 1 is one wherein diffracting actions, namely, functions to correct spherical aberration obtained by a diffractive structure provided on only one side of a conventional objective lens are shared by two diffractive structures by providing them respectively on both sides of an objective lens.

Accordingly, there has been a problem that coma and astigmatism caused in the case of an image height caused by tracking or the like cannot be corrected for two types of optical information recording media.

SUMMARY OF THE INVENTION

The invention has been achieved in view of the problems stated above, and its object is to provide an objective optical element and an optical pickup device which are used for reproducing and/or recording of information for two types of optical information recording media each having a different working wavelength to correct spherical aberration and wavefront aberration, are corrected in terms of sine conditions.

For the purpose of solving the problems mentioned above, the invention described in Item 1 is an objective optical element of an optical pickup device that conducts reproducing and/or recording of information by converging a light flux that is emitted from the first light source and has the first wavelength λ1 on the first optical information recording medium having protective base board thickness t1 and by converging a light flux that is emitted from the second light source and has the second wavelength λ2 (λ2>λ1) on the second optical information recording medium having protective base board thickness t2 (t2≧t1), wherein the first optical surface having thereon the first diffractive structure composed of plural diffractive ring-shaped zones in a shape of concentric circles having their centers on an optical axis and of a step surface that is arranged to be in parallel with the optical axis substantially and connects two diffractive ring-shaped zones adjoining in the radial direction and the second optical surface having thereon the second diffractive structure composed of plural diffractive ring-shaped zones in a shape of concentric circles having their centers on an optical axis and of a step surface that is arranged to be in parallel with the optical axis substantially and connects two diffractive ring-shaped zones adjoining in the radial direction are provided, and the step surface of the first diffractive structure is arranged to face the optical axis side, while, the step surface of the second diffractive structure is arranged to face the side opposite to the optical axis.

Figure 1:
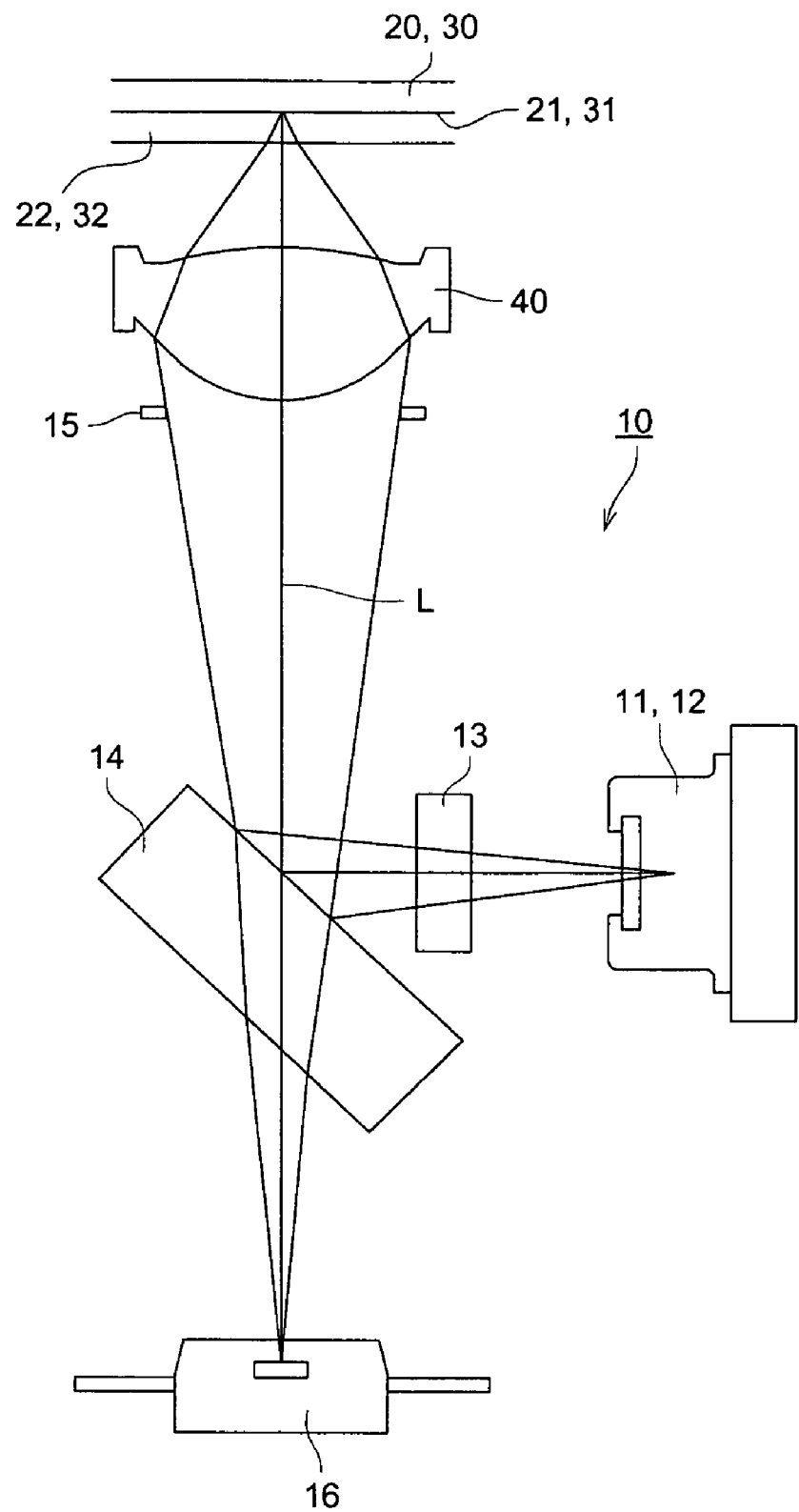
FIG. 1 is a schematic illustration showing an example of an optical pickup device relating to the present embodiment.

Each of FIGS. 4(a) and 4(b) is a diagram showing longitudinal spherical aberration and an amount of offense against the sine condition.

Each of FIGS. 5(a)-5(c) is a diagram showing wavefront aberration for the field angle of incidence.

Each of FIGS. 6(a) and 6(b) is a diagram showing longitudinal spherical aberration and an amount of offense against the sine condition.

Each of FIGS. 7(a)-7(c) is a diagram showing wavefront aberration for the field angle of incidence.

Each of FIGS. 8(a) and 8(b) is a diagram showing longitudinal spherical aberration and an amount of offense against the sine condition.

Each of FIGS. 9(a)-9(c) is a diagram showing wavefront aberration for the field angle of incidence.

DETAILED DESCRIPTION OF THE PREFERRED EMBODIMENT

Preferred examples of the invention will be explained as follows.

In the present specification, an objective optical element represents an objective lens, and it is not limited to one composed of a single lens alone, and lens groups composed of plural lenses combined in the direction of an optical axis may be regarded collectively as an objective optical element.

In a narrow sense, an objective lens is a lens having a light-converging function arranged at a position closest to an optical information recording medium to face it when the optical information recording medium is inserted in the optical pickup device, and in a broad sense, it is a lens which can be moved by an actuator together with the aforementioned lens at least in the direction of the optical axis thereof.

Further, the optical information recording medium represents an ordinary optical disc that conducts reproducing and/or recording of information by the use of a light flux having a prescribed wavelength, such as CD, DVE, CD-R, MD, MO and high density DVD.

Reproducing of information means reproducing information recorded on an information recording surface of an optical information recording medium, and recording of information means recording information on an information recording surface of the optical information recording medium. Incidentally, reproducing mentioned in this case includes mere reading of information.

Further, an optical pickup device may be either one used for conducting only recording or reproducing of information or one used for conducting both recording and reproducing.

In the present specification, a protective base board means an optically transparent and parallel flat plate that is formed on the side of a plane of incidence for a light flux on an information recording surface for protecting the information recording surface of an information recording medium, and a protective base board thickness means a thickness of the parallel flat plate. A light flux emitted from the light source is converged by the objective lens on an information recording surface of the optical information recording medium through the protective base board.

In the present specification, an image-side numerical aperture of the optical element means a numerical aperture of the lens surface in the optical element positioned to be closest to the optical information recording medium side.

Further, the numerical aperture means a numerical aperture defined as a result that a light flux contributing to formation of a spot in the best image point is restricted by parts or members having a function of a diaphragm or a filter provided on the optical pickup device or by a diffractive structure provided on the optical element.

When the optical pickup device of the invention is used as an optical pickup device having compatibility for CD and DVD, a wavelength of a light flux having first wavelength λ1 used for DVD is in a range of 600 nm-700 nm, and a wavelength of a light flux having second wavelength λ2 used for CD is in a range of 750 nm-850 nm.

In the invention described in Item 1, diffractive structures (first diffractive structure and second diffractive structure) are formed respectively on two surfaces of an objective optical element, a step surface of the first diffractive structure is arranged to face the optical axis side, and a step surface of the second diffractive structure is arranged to face the side opposite to the optical axis.

Therefore, if the number of diffractive ring-shaped zones is made to be greater than an ordinary number by making the pitch of the diffractive ring-shaped zones formed on the first optical surface to be smaller than that of the diffractive ring-shaped zones formed on a plane of incidence of an ordinary objective lens used for compatibility, a difference of an amount of offense against the sine condition between light fluxes respectively of the first and second wavelengths is corrected by the diffracting function given by the first diffractive structure on the first optical surface for the light flux with the second wavelength λ2, and spherical aberration is corrected excessively.

When the step surface of the second diffractive structure is arranged to face the side opposite to the optical axis, a shape of the diffractive ring-shaped zone on the second optical surface gives a diffracting function which is opposite to that given by the diffractive ring-shaped zone on the first optical surface. Therefore, on the second optical surface, the diffracting function opposite to that of the first diffractive structure is given to a light flux with wavelength $\lambda 2$ by the second diffractive structure, thus, an excessive amount of correction for spherical aberration is corrected to the appropriate state, and occurrence of coma and astigmatism in the case of an image height caused by tracking or the like can be corrected for both of two types of optical information recording media.

The invention described in Item 2 is an objective optical element of an optical pickup device that conducts reproducing and/or recording of various pieces of information by converging a light flux that is emitted from the first light source and has the first wavelength $\lambda 1$ on the first optical information recording medium having protective base board thickness t1 and by converging a light flux that is emitted from the second light source and has the second wavelength $\lambda 2$ ($\lambda 2 > \lambda 1$) on the second optical information recording medium having protective base board thickness t2 ($t2 \geq t1$), wherein the first optical surface having thereon the first diffractive structure composed of plural diffractive ring-shaped zones in a shape of concentric circles having their centers on an optical axis and the second optical surface having thereon the second diffractive structure composed of plural diffractive ring-shaped zones in a shape of concentric circles having their centers on an optical axis are provided, and when an amount of addition of an optical path difference for the aforementioned light fluxes by the first diffractive structure and the second diffractive structure is expressed by a differential coefficient [$\phi'(h) = (2B_2 h + 4B_4 h^3 + 6B_6 h^5 + \ldots B_n h^n)$ of optical path difference function $\phi(h)$ defined by $\phi(h) = B_2 h^2 + B_4 h^4 + 6B_6 h^6 + \ldots B_n h^n$) by using h representing a height from an optical axis and coefficient Bn of optical path difference function in $n^{th}$ order (n is an even number), $\phi'(h) < 0$ is satisfied for the first diffractive structure, and $\phi'(h) > 0$ is satisfied for the second diffractive structure.

The invention described in Item 2 makes it possible to obtain the same effects as in Item 1.

The invention described in Item 3 is the objective optical element described in Item 1 or Item 2, wherein at least one of the first optical surface and the second optical surface is provided with at least two areas in a shape of concentric circles having centers on an optical axis, and a light flux passing through a central area including an optical axis among the two areas is used for conducting reproducing and/or recording of information for the first optical information recording medium and the second optical information recording medium, while, a light flux passing through a peripheral area positioned outside the central area among the two areas is used for conducting reproducing and/or recording of information mainly for the first optical information recording medium.

In the invention described in Item 3, the same effect as in Item 1 or Item 2 can be obtained, and at least one of the first and second optical surfaces is provided with two areas including a central area and a peripheral area. Accordingly, for example, it is possible to have the function as the so-called aperture limiting filter that prevents light fluxes passing through peripheral areas of the first and second optical surfaces among light fluxes having wavelength $\lambda 2$ from being converged on an information recording surface of the second optical information recording medium.

The invention described in Item 4 is the objective optical element described in Item 3, wherein at least the first optical surface is provided with the central area and the peripheral area, and the central area is provided with the first diffractive structure.

The invention described in Item 4 makes it possible to obtain the same effects as in Item 3.

The invention described in Item 5 is the objective optical element described in Item 3, wherein at least the second optical surface is provided with the central area and the peripheral area, and the central area is provided with the second diffractive structure.

The invention described in Item 5 makes it possible to obtain the same effects as in Item 3.

The invention described in Item 6 is the objective optical element described in Item 3, wherein each of the first optical surface and the second optical surface is provided with the central area and the peripheral area.

The invention described in Item 6 makes it possible to obtain the same effects as in Item 3.

The invention described in Item 7 is the objective optical element described in Item 6, wherein the first diffractive structure is provided on the central area of the first optical surface, and the second diffractive structure is provided on the central area of the second optical surface.

The invention described in Item 7 makes it possible to obtain the same effects as in Item 6.

The invention described in Item 8 is the objective optical element described in Item 7, wherein OSC (h max/2)<0 and OSC (h max/2)<OSC (h max) are satisfied by amount of offense against the sine condition OSC relating to a light flux with the first wavelength $\lambda 1$ passing through the central area, when h represents a height of an optional position of the central area from the optical axis, h max represents a height of the position of the central area farthest from the optical axis, u' represents an angle formed between the light flux passing through the position having the height h, f1 represents a focal length relating to the light flux with the first wavelength $\lambda 1$, and the amount of offense against the sine condition OSC is prescribed to be OSC (h)=h/sin u'−f1.

In the invention described in Item 8, the same effect as in Item 7 can be obtained, and OSC (h max/2)<0 and OSC (h max/2)<OSC (h max) are satisfied by amount of offense against the sine condition OSC relating to a light flux with the first wavelength $\lambda 1$ passing through the central area, and therefore, off-axis coma can be balanced between two types of optical information recording media so that occurrence of off-axis coma in the case of using the second optical information recording medium may be reduced while occurrence of off-axis coma in the case of using the first optical information recording medium is reduced.

Incidentally, in the case of the structure wherein finite light enters an objective optical element, it is assumed that h=sin u×(1−1/m)×f' is replaced with f=(1−m)×f' in the expression of OSC stated above, when u represents an angle formed by a light flux entering the objective optical element, m represents an image forming magnification of an individual objective optical element and f' represents a focal length.

The invention described in Item 9 is the objective optical element described in either one of Items 1-8, wherein the first optical surface is arranged to be closer to the light source on the optical pickup device, and the second optical surface is arranged to be closer to the optical information recording medium.

The invention described in Item 9 makes it possible to obtain the same effects as in either one of Items 1-8.

The invention described in Item 10 is the objective optical element described in either one of Items 1-9, wherein $0.25 \leq L2/L1 \leq 0.85$ is satisfied when L1 represents the number of the diffractive ring-shaped zones of the first diffractive structure and L2 represents the number of the diffractive ring-shaped zones of the second diffractive structure.

The invention described in Item 10 makes it possible to obtain the same effects as in either one of Items 1-9.

Incidentally, it is more preferable that L2/L1 is within the aforementioned range and L1 satisfies 8<L1<56.

The invention described in Item 11 is the objective optical element described in either one of Items 1-10, wherein the first wavelength $\lambda 1$ satisfies 600 nm$\leq \lambda 1 \leq$700 nm and the second wavelength $\lambda 2$ satisfies 750 nm$\leq \lambda 2 \leq$850 nm.

The invention described in Item 11 makes it possible to obtain the same effects as in either one of Items 1-10, and to obtain an optical pickup device that is compatible for DVD and CD.

The invention described in Item 12 is the objective optical element described in either one of Items 1-11, wherein m1=m2=0 is satisfied when m1 represents an image forming magnification for a light flux having the first wavelength $\lambda 1$ and m2 represents an image forming magnification for a light flux having the second wavelength $\lambda 2$.

The invention described in Item 12 makes it possible to obtain the same effects as in either one of Items 1-11, and to obtain an optical pickup device of a type of the so-called infinite system wherein substantially parallel rays having respectively the first wavelength $\lambda 1$ and the second wavelength $\lambda 2$ enter the objective optical element.

The invention described in Item 13 is the objective optical element described in either one of Items 1-11, wherein m1>m2 is satisfied when m1 represents an image forming magnification for a light flux having the first wavelength $\lambda 1$ and m2 represents an image forming magnification for a light flux having the second wavelength $\lambda 2$.

The invention described in Item 13 makes it possible to obtain the same effects as in either one of Items 1-11, and to improve a degree of freedom for a design of an optical pickup device, including, for example, using infinite light of a light flux having the first wavelength $\lambda 1$ for the first optical information recording medium and using divergent light of a light flux having the second wavelength $\lambda 2$ for the second optical information recording medium.

Further, since the image forming magnification satisfying m1>m2 causes a combination of image forming magnifications that corrects occurrence of spherical aberration in two different optical information recording media, it is possible to reduce the number of diffractive ring-shaped zones necessary for compatibility, and to improve productivity.

The invention described in Item 14 is the objective optical element described in Item 13, wherein m1=0 is satisfied when m1 represents an image forming magnification for a light flux having the first wavelength $\lambda 1$ and m2 represents an image forming magnification for a light flux having the second wavelength $\lambda 2$.

The invention described in Item 14 makes it possible to obtain the same effects as in Item 13.

The invention described in Item 15 is the objective optical element described in either one of Items 1-11, wherein (m1−0.01)<m2<(m1+0.01)<0 is satisfied when m1 represents an image forming magnification for a light flux having the first wavelength $\lambda 1$ and m2 represents an image forming magnification for a light flux having the second wavelength $\lambda 2$.

The invention described in Item 15 makes it possible to obtain the same effects as in either one of Items 1-11, and to use divergent light of each of light fluxes having respectively the first wavelength $\lambda 1$ and the second wavelength $\lambda 2$ for each of the first optical information recording medium and the second optical information recording medium.

The invention described in Item 16 is the objective optical element described in Item 13 or Item 15, wherein −0.295$\leq$m1$\leq$−0.049 is satisfied.

The invention described in Item 16 makes it possible to obtain the same effects as in Item 13 or Item 15.

Incidentally, it is more preferable to satisfy −0.155<m1<−0.115. If m1 is within this range, it is possible to construct a pickup apparatus for optical system without using members such as a coupling lens or the like.

The invention described in Item 17 is characterized in that the objective optical element described in either one of Items 1-16 is used to conduct reproducing and/or recording of information by converging a light flux with the first wavelength $\lambda 1$ emitted from the first light source on the first optical information recording medium having protective base board thickness t1 and by converging a light flux with the second wavelength $\lambda 2$ ($\lambda 2 > \lambda 1$) emitted from the second light source on the second optical information recording medium having protective base board thickness t2 (t2$\geq$t1).

In the invention described in Item 17, a diffractive structures (the first diffractive structure and the second diffractive structure) are formed respectively on two surfaces of the objective optical element, a step surface of the first diffractive structure is arranged to face the optical axis side and a step surface of the second diffractive structure is arranged to face the side opposite to the optical axis.

Therefore, if a pitch of the diffractive ring-shaped zones formed on the first optical surface is made to be smaller than a pitch of the diffractive ring-shaped zones formed on a plane of incidence of an ordinary objective lens used for compatibility and thereby the number of the diffractive ring-shaped zones is made to be larger than an ordinary number, sine conditions are corrected and spherical aberration is corrected excessively by diffracting actions given by the first diffractive structure of the first optical surface to the light flux having the second wavelength $\lambda 2$.

Further, the step surface of the second diffractive structure arranged to face the side opposite to the optical axis makes a shape of ring-shaped zones of the second optical surface to give a diffracting function that is opposite to that given by the diffractive ring-shaped zones of the first optical surface. Therefore, on the second optical surface, the diffracting function opposite to that of the first diffractive structure is given to the light flux having wavelength $\lambda 2$, an excessive amount of correction for spherical aberration is corrected to the appropriate state, and occurrence of coma and astigmatism in the case of an image height caused by tracking and others can be corrected for both of two types of optical information recording media.

Embodiments of an objective optical element and an optical pickup device of the invention will be explained as follows, referring to drawings.

As shown in FIG. 1, in optical pickup device 10, a light flux having wavelength $\lambda 1$ (650 nm) is emitted from first semiconductor laser 11 (first light source) toward first optical information recording medium 20 (DVD in the present embodiment), while, a light flux having wavelength $\lambda 2$ (780 nm) is emitted from second semiconductor laser 12 (second light source) toward second optical information recording medium 30 (CD in the present embodiment). These light fluxes are made to enter objective lens 40 (objective optical element) as divergent light to be converged respectively on information recording surfaces 21 and 31 of prescribed optical information recording media, so that recording of various types of information and reading of recorded information may be conducted.

Incidentally, since the first semiconductor laser 11 and the second semiconductor laser 12 are unitized as a light source, a light flux having wavelength $\lambda 1$ and a light flux having wavelength $\lambda 2$ emitted respectively from semiconductor lasers 11 and 12 are shown collectively with solid lines in FIG. 1.

In the following explanation, the traveling direction of the light flux advancing from the light source toward the information recording medium is assumed to be the front.

When recording information on or reproducing information from DVD 20, a light flux having wavelength λ1 emitted from the first semiconductor laser 11 passes through diffraction grating 13 and is reflected on half mirror 14. Then, it is further stopped down by diaphragm 15, and is converged by objective lens 40 on information recording surface 21 through protective base board 22 of DVD 20.

Actions of the objective lens 40 on the light flux having wavelength λ1 in this case will be explained later.

Then, the light flux modulated by information pits and reflected on the information recording surface 21 passes again through the objective lens 40, the diaphragm 15 and the half mirror 14 to enter photodetector 16, thus, the signals are obtained through reading of information recorded on DVD 20, by the use of signals outputted from the photodetector 16.

When recording information on or reproducing information from CD 30, a light flux having wavelength λ2 emitted from the second semiconductor laser 12 passes through diffraction grating 13 and is reflected on half mirror 14, in the same way. Then, it is further stopped down by diaphragm 15, and is converged by objective lens 40 on information recording surface 31 through protective base board 32 of CD 30. Incidentally, the protective base board 32 of CD 30 and the protective base board 22 of DVD 20 are shown by the same diagram for convenience in FIG. 1.

Actions of the objective lens 40 on the light flux having wavelength λ2 in this case will be explained later.

Then, each of the light fluxes modulated by information pits and reflected respectively on the information recording surfaces 21 and 31 passes again through the objective lens 40, the diaphragm 15 and the half mirror 14 to enter photodetector 16, thus, the signals are obtained through reading of information recorded on CD 30, by the use of signals outputted from the photodetector 16.

Further, on the photodetector 16, changes in an amount of light caused by changes in a shape and position of a spot are detected, for detection of focusing and detection of a track. Based on results of the detections, an unillustrated two-dimensional actuator moves the objective lens 40 so that a light flux emitted from the first semiconductor laser 11 or a light flux emitted from the second semiconductor laser 12 may form an image on information recording surface 21 of DVD 20 or on information recording surface 31 of CD 30, and moves the objective lens 40 so that an image is formed on a prescribed track.

Figure 2:
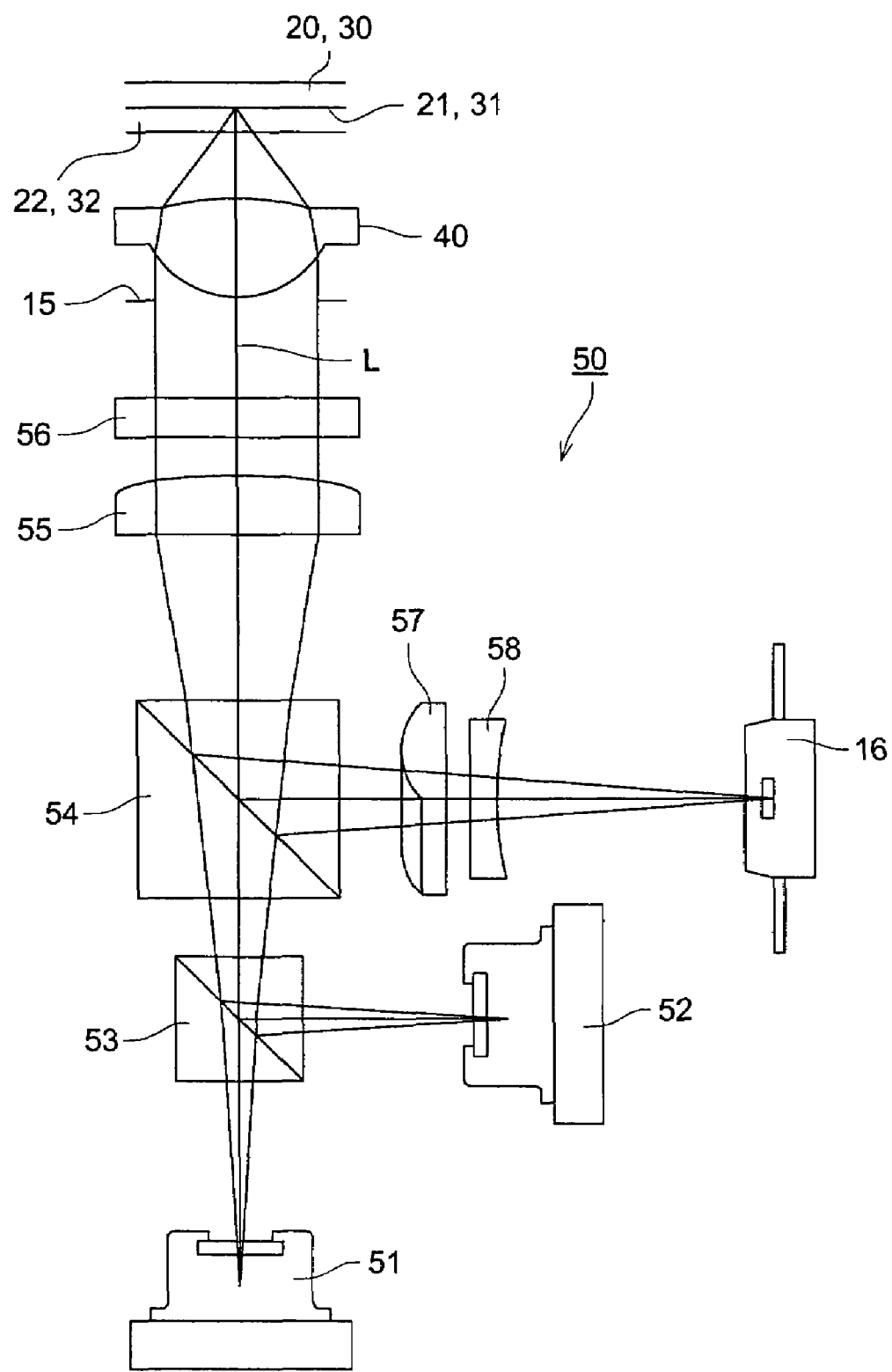
FIG. 2 is a schematic illustration showing an example of an optical pickup device relating to the present embodiment.

Incidentally, though there is shown optical pickup device 10 of the so-called finite type wherein divergent light enters the objective lens 40, in FIG. 1, optical pickup device 50 of the so-called infinite type wherein parallel light enters the objective lens 40 as shown in FIG. 2 may also be employed.

Incidentally, in the structure of the optical pickup device 50 shown in FIG. 2, parts or members which are the same as those in the optical pickup device 10 shown in FIG. 1 are given the same symbols to be shown in FIG. 2.

In the case of optical pickup device 50 in FIG. 2, first semiconductor laser 51 serving as the first light source and second semiconductor laser 52 serving as the second light source are provided separately, and a light flux having wavelength λ1 emitted from the first semiconductor laser 51 passes through half mirror 53 and beam splitter 54 to be collimated by collimator 55 to turn into parallel light, then passes through ¼ wavelength plate 56 to be stopped down by diaphragm 15, and is converged by objective lens 40 on information recording surface 21 through protective base board 22 of DVD 20.

Actions of the objective lens 40 on the light flux having wavelength λ1 in this case will be explained later.

Then, in the structure, the light flux modulated by information pits and reflected on the information recording surfaces 21 passes again through the objective lens 40 and the diaphragm 15 to be taken out by beam splitter 54, and advances to photodetector 16 through cylindrical lens 57 and concave lens 58.

A light flux having wavelength λ2 emitted from the second semiconductor laser 52 passes through beam splitter 54 in the same way as in the light flux having wavelength λ1, after the traveling direction of the light flux is changed by about 90° by half mirror 53, then is collimated by collimator 55 to turn into parallel light and passes through ¼ wavelength 56 to be stopped down by diaphragm 15, and is converged by objective lens 40 on information recording surface 31 through protective base board 32 of CD 30.

Actions of the objective lens 40 on the light flux having wavelength λ2 in this case will be explained later.

Then, in the structure, the light flux modulated by information pits and reflected on the information recording surfaces 31 passes again through the objective lens 40 and the diaphragm 15 to be taken out by beam splitter 54, and advances to photodetector 16 through cylindrical lens 57 and concave lens 58.

Figure 3:
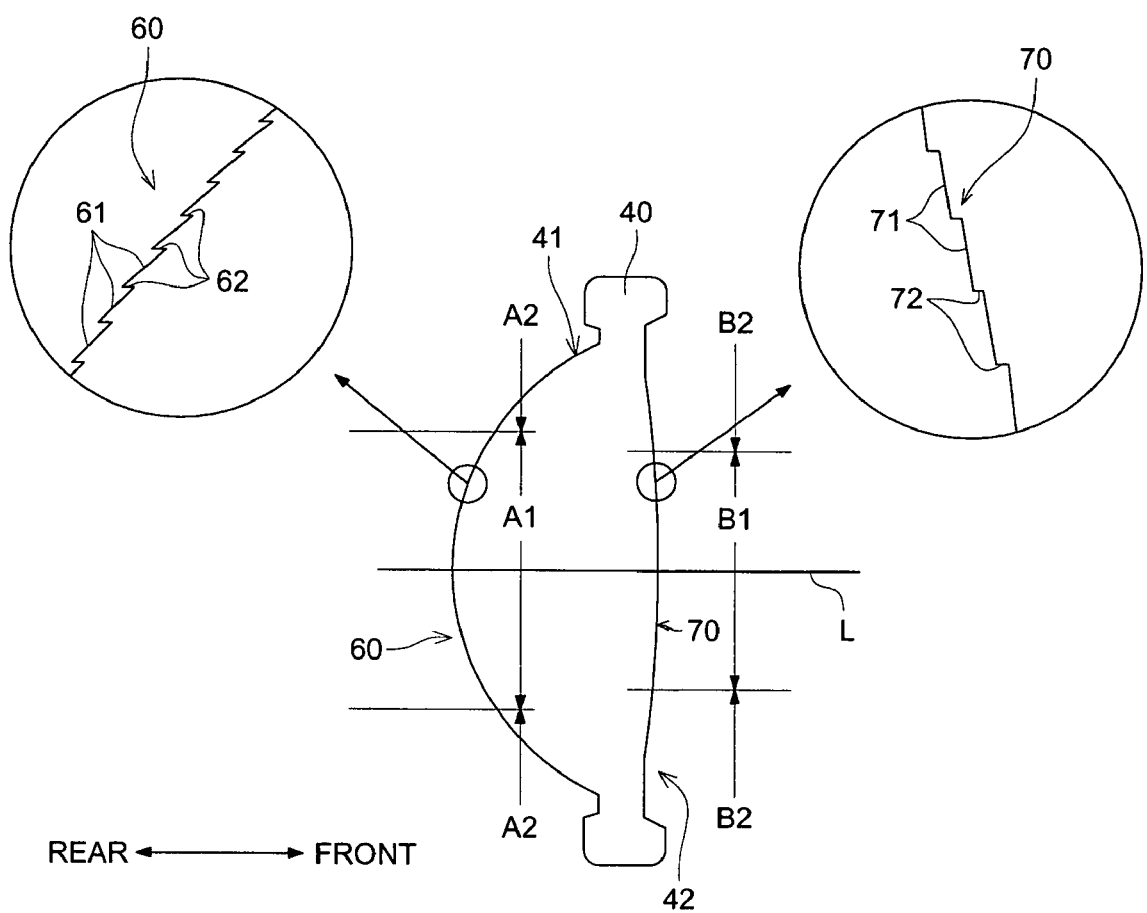
FIG. 3 is a side view of primary portions showing the structure of an objective lens.

As shown in FIG. 3, objective lens 40 serving as an objective optical element is a single lens that is a double-sided aspherical lens.

First diffractive structure 60 is formed in a range (central area A1) that includes optical axis L and has a height of a certain value h or less from the optical axis L on an optical surface on one side (light source side) of objective lens 40.

In the explanation below, an optical surface provided with the first diffractive structure 60 is called "first optical surface 41".

Incidentally, the structure in the range (peripheral area A2) positioned to be outside the central area A1 is not limited in particular, and the first diffractive structure 60 is also formed on the peripheral area A2.

The first diffractive structure 60 is composed of plural diffractive ring-shaped zones 61 in a shape of concentric circles having centers on optical axis L and of step surfaces 62 each being arranged to be in parallel substantially with optical axis L and connecting two diffractive ring-shaped zones adjoining in the radial direction, as shown in an enlarged drawing encircled by a circle in FIG. 3.

Incidentally, "parallel substantially" means that, when extension directions for step surfaces 62 and for diffractive ring-shaped zones 61 are compared relatively, the step surface 62 is more extended in the direction of optical axis L than diffractive ring-shaped zone 61, and the step surface 62 does not need to be in parallel with the direction of optical axis L. An expression of "parallel substantially" for step surface 72 of the second diffractive structure 70 mentioned below is also the same as the foregoing.

Further, step surface 62 of the first diffractive structure 60 is arranged to face the optical axis L side. For example, step surface 62 of the first diffractive structure 60 may be arranged to face the center of the optical surface on the optical axis L.

Incidentally, the expressions "to face the optical axis L side" and "to face the center" mean that a perpendicular line, normal to and extending away from the exterior surface of the step surface 62, extends in a direction that approaches the optical axis L.

Two diffractive ring-shaped zones 61 adjoining each other in the radial direction are arranged to be continuous when a front portion of the step surface 62 is connected to the outer circumference portion of the ring-shaped zone 61 on one side and a rear portion of the step surface 62 is connected to the inner circumference portion of the ring-shaped zone 61 on the other side.

Further, a pitch of diffractive ring-shaped zones 61 formed on central area A1 of the first optical surface 41 is designed to be smaller than a pitch of diffractive ring-shaped zones 61 formed on a plane of incidence of an ordinary objective lens used generally for compatibility.

A light flux passing through central area A1 of the first optical surface 41 is used for reproducing and/or recording of information for the first optical information recording medium 20 and the second optical information recording medium 30, and a light flux passing through peripheral area A2 of the first optical surface 41 is used for reproducing and/or recording of information mainly for the first optical information recording medium 20.

Further, the second diffractive structure 70 is provided in a range (central area B1) that has a height of a certain value h or less from the optical axis L on an optical surface on the other side (information recording medium side) of objective lens 40.

In the explanation below, an optical surface provided with the second diffractive structure 70 is called "second optical surface 2".

Incidentally, though the structure of the range (peripheral area B2) positioned outside the central area B1 is not limited in particular, the second diffractive structure 70 is formed also on the peripheral area B2 in the present embodiment.

The second diffractive structure 70 is also composed of plural diffractive ring-shaped zones 71 in a shape of concentric circles having centers on optical axis L and of step surfaces 72 each being arranged to be in parallel substantially with optical axis L and connecting two diffractive ring-shaped zones adjoining in the radial direction, as shown in an enlarged drawing encircled by a circle in FIG. 3.

The step surface 72 of the second diffractive structure 70 is arranged to face the side opposite to optical axis L. For example, step surface 72 of the second diffractive structure 70 may be arranged to face the periphery of the optical surface located far from the optical axis L.

Incidentally, the expressions "to face the side opposite to the optical axis" and "to face the periphery" mean that a perpendicular line, normal to and extending away from the exterior surface of the step surface 72, extends in a direction that leaves the optical axis L.

Two diffractive ring-shaped zones 71 adjoining each other in the radial direction are arranged to be continuous when a front portion of the step surface 72 is connected to the outer circumference portion of the ring-shaped zone 71 on one side and a rear portion of the step surface 72 is connected to the inner circumference portion of the ring-shaped zone 71 on the other side.

By setting a shape of the diffractive ring-shaped zones 71 of the second optical surface 42 as in the foregoing, it is possible to give diffracting functions opposite to those given by the first diffractive structure 60 to a light flux passing through the second diffractive structure 70.

A light flux passing through central area B1 of the second optical surface 42 is used for reproducing and/or recording of information for the first optical information recording medium 20 and the second optical information recording medium 30, and a light flux passing through peripheral area B2 of the second optical surface 42 is used for reproducing and/or recording of information mainly for the first optical information recording medium 20.

Incidentally, it is preferable that $0.25 \leq L2/L1 \leq 0.85$ is satisfied when L1 represents the number of diffractive ring-shaped zones of the first diffractive structure 60 and L2 represents the number of diffractive ring-shaped zones of the second diffractive structure 70.

By setting the numbers of diffractive ring-shaped zones 61 and diffractive ring-shaped zones 71 respectively of the first diffractive structure 60 and the second diffractive structure 70 so that a value of L1-L2 may represent the number of the diffractive ring-shaped zones necessary for the objective lens (objective lens having on its one surface a diffractive structure or objective lens described in Patent Document 1) having a diffractive structure in a compatible optical pickup device to have compatibility, it is possible to obtain an objective optical element and an optical pickup device having compatibility for two types of optical information recording media.

Next, actions of the objective lens 40 on a light flux having wavelength λ1 and a light flux having wavelength λ2 will be explained.

When a light flux having wavelength λ1 enters the first optical surface 41 of the objective lens 40, the light flux receives diffracting actions made by the first diffractive structure 60 formed on central area A1 and peripheral area A2 of the first optical surface 41, and then, on the second optical surface 42, the light flux receives diffracting actions made by the second diffractive structure 70 formed on central area B1 and peripheral area B2 of the second optical surface 42.

Then, the light flux having wavelength λ1 forms a light-converged spot on information recording surface 21 of DVD 20, and is used for conducting reproducing and/or recording of information for DVD 20.

When a light flux having wavelength λ2 enters the first optical surface 41 of the objective lens 40, the light flux passing through central area A1 of the first optical surface 41 among light fluxes having wavelength λ2 receives diffracting actions made by the first diffractive structure 60 formed on central area A1 of the first optical surface 41, and then, on the second optical surface 42, the light flux receives diffracting actions made by the second diffractive structure 70 formed on central area B1 of the second optical surface 42. Then, the light flux having wavelength λ2 forms a light-converged spot on information recording surface 31 of CD 30, and is used for conducting reproducing and/or recording of information for CD 30.

In this case, by making a pitch of diffractive ring-shaped zones 61 formed on central area A1 of the first optical surface 41 to be smaller than a pitch of diffractive ring-shaped zones 61 formed on a plane of incidence of ordinary objective lens 40 used for compatibility, as stated above, the number of the diffractive ring-shaped zones 61 can be made to be greater than that in an ordinary case. Therefore, sine conditions are corrected and spherical aberration is corrected excessively, for the light flux having wavelength λ2, by the diffracting actions given by the first diffractive structure 60 on the central area A1 of the first optical surface 41.

Next, as stated above, a shape of diffractive ring-shaped zones 71 of the second optical surface 42 is established to be one wherein diffracting actions opposite to those given by the diffractive ring-shaped zones 61 of the first optical surface 41 are given. Therefore, on central area B1 of the second optical surface 42, diffracting actions opposite to those of the first diffractive structure 60 are given to a light flux having wavelength λ2 by the second diffractive structure 70, an excessive amount of correction of spherical aberration is corrected to be in an appropriate state and sufficient correction of spherical aberration for reproducing and/or recording for CD 30 is conducted.

Incidentally, a light flux passing through peripheral area A2 of the first optical surface 41 among light fluxes having wavelength λ2 entering the first optical surface 41 of objective lens 40 receives diffracting actions made by the first diffractive structure 60 provided on peripheral area A2 of the first optical surface 41, and then, on the second optical surface 42, the aforementioned light flux receives diffracting actions made by the second diffractive structure 70 provided on peripheral area B2 of the second optical surface 42. This light flux having wavelength λ2 does not form a light-converged spot on information recording surface 31 of CD 30, and it is not used for conducting reproducing and/or recording of information for CD 30.

On the objective lens 40 of the present embodiment, central area A1 and peripheral area A2 are provided on the first optical surface 41, and central area B1 and peripheral area B2 are provided on the second optical surface 42, and therefore, there is provided a function as the so-called aperture limiting filter wherein light fluxes passing respectively through the peripheral area A2 of the first optical surface 41 and the peripheral area B2 of the second optical surface 42 among light fluxes having wavelength λ2 are not converged respectively on information recording surface 21 and information recording surface 31 of CD 30.

In the objective lens 40 of the present embodiment, a pitch of diffractive ring-shaped zones 61 formed on central area A1 of the first optical surface 41 is made to be smaller than that of diffractive ring-shaped zones formed on an ordinary objective lens 40, so that the number of the diffractive ring-shaped zones 61 is increased, which causes a problem that productivity of objective lens 40 is lowered. However, it is possible to avoid a decline of productivity without increasing greatly the number of diffractive ring-shaped zones 61 of the total objective lens 40, compared with an ordinary case, by making a pitch of diffractive ring-shaped zones 61 formed on peripheral area A2 to be greater than a pitch of diffractive ring-shaped zones formed at the position that is farthest from the optical axis on the central area so that the number of diffractive ring-shaped zones may not be increased excessively.

Though the first diffractive structure 60 is provided on peripheral area A2 of the first optical surface 41 and the second diffractive structure 70 is provided on peripheral area B2 of the second optical surface 42 in the present embodiment, the structure of peripheral areas A2 and B2 of objective lens 40 has only to be one wherein a light flux having wavelength λ1 is converged correctly on information recording surface 21 of DVD 20 and divergent light having wavelength λ2 is converged on the outside of information recording surface 31 of CD 30.

Therefore, for example, a diffractive structure that is different from the first diffractive structure 60 may be provided on peripheral area A2 of the first optical surface 41 and a diffractive structure that is different from the second diffractive structure 70 may be provided on peripheral area B2 of the second optical surface 42.

Further, both of or either one of peripheral area A2 of the first optical surface 41 and peripheral area B2 of the second optical surface 42 may be composed of a refracting interface.

EXAMPLE 1

Next, Example 1 for an optical pickup device and an objective lens will be explained as follows.

An optical pickup device in the present example is of the same structure as that in optical pickup device 50 shown in FIG. 2, and in that structure, a light flux having wavelength λ1 (655 nm) used for DVD and a light flux having wavelength λ2 (785 nm) used for CD enter an objective lens as infinite light.

An objective lens in the present example also is of the same structure as that in objective lens 40 shown in FIG. 3, and diffractive ring-shaped zones serving as the first diffractive structure are provided on central area having a height from optical axis L of not more than 1.246 mm on an optical surface (plane of incidence) closer to a light source on an objective lens representing a single lens that is a double-sided aspherical lens and on a peripheral area having a height of not less than 1.246 mm.

Further, diffractive ring-shaped zones serving as the second diffractive structure are provided on central area having a height from an optical axis of not more than 1.016 mm on an optical surface (plane of emergence) closer to an optical information recording medium side on an objective lens and on a peripheral area having a height of not less than 1.016 mm.

A step surface of the first diffractive structure is arranged to face the side of optical axis L, and a step surface of the second diffractive structure is arranged to face the side opposite to the optical axis.

Lens data are shown in Tables 1 and 2.

TABLE 1

| Example (1) | | | | |
|---|---|---|---|---|
| Focal length | | $f_1$ = 2.33 mm | $f_2$ = 2.35 mm | |
| Numerical aperture | | NA1 = 0.65 | NA2 = 0.53 | |
| Image forming magnification | | m = 0.0 | m = 0.0 | |
| $i^{th}$ surface | Ri | di (655 nm) | ni (655 nm) | di (785 nm) | ni (785 nm) |
| 0 | ∞ | | ∞ | | |
| 1 | ∞ | 0.0 | 1.0 | 0.0 | 1.0 | *1 |
| 2 | 1.39962 | 1.29 | 1.52915 | 1.29 | 1.52541 | *2 |
| 2' | 1.39839 | −0.000964 | — | −0.000964 | — | *2 |
| 3 | −7.05001 | 1.206672 | — | 0.837043 | — | *2 |
| 3' | −6.01503 | 0.0 | 1.0 | 0.0 | 1.0 | *2 |
| 4 | ∞ | 0.6 | 1.57752 | 1.2 | 1.57063 | |
| 5 | ∞ | | | | | |

*1; Aperture diameter 3.03 mm
*2; Aspheric surface · Diffractive interface
*di represents a displacement from $i^{th}$ surface to $(i + 1)^{th}$ surface.
*d2' represents a displacement from $2^{nd}$ surface to $2'^{th}$ surface.
*d3' represents a displacement from $3^{rd}$ surface to $3'^{th}$ surface.

As shown in Table 1, the objective lens of the present example is established to have focal length $f_1$=2.33 mm, image-side numerical aperture NA1=0.65 and image forming magnification m=0.0 when first wavelength λ1 emitted from the first light source is 655 nm, and to have focal length $f_2$2.35 mm, image-side numerical aperture NA2=0.53 and image forming magnification m=0.0 when second wavelength λ2 emitted from the second light source is 785 nm.

Surface numbers 2 and 2' in Table 1 express respectively a central area having a height from an optical axis of not more than 1.246 mm on a plane of incidence of the objective lens and a peripheral area having a height from an optical axis of not less than 1.246 mm, surface numbers 3 and 3' express respectively a central area having a height from an optical axis of not more than 1.016 mm on a plane of emergence of the objective lens and a peripheral area having a height from an optical axis of not less than 1.016 mm and surface numbers 4 and 5 express respectively a surface of a protective base board and an information recording surface of an optical information recording medium. Further, Ri represents a radius of curvature, di represents an amount of displacement from $i^{th}$ surface to $(i+1)^{th}$ surface in the direction of optical axis L, and ni represents a refractive index of each surface.

Each of $2^{nd}$ surface, $2^{\prime th}$ surface, $3^{rd}$ surface and $3^{\prime th}$ surface of the objective lens is formed to be an aspheric surface which is prescribed by the expression wherein coefficients shown in Table 1 and Table 2 are substituted in the following expression (Numeral 1) and is axially symmetric about optical axis L.

Numeral 1
Expression of Aspheric Surface Form $$X(h) = \frac{(h^2/R_i)}{1+\sqrt{1-(1+\kappa)(h/R_i)^2}} + \sum_{i=0}^{8} A_{2i} h^{2i}$$

In the espression, X(h) represents an axis in the direction of optical axis L (traveling direction of light is assumed to be positive), $\kappa$ presents a conic constant and $A_{2i}$ presents a coefficient of the aspheric surface.

TABLE 2

Aspheric surface · diffractive surface data

| | | $2^{nd}$ surface ($0 \leq h < 1.246$ mm) | | | $2^{\prime th}$ surface ($1.246$ mm $\leq h$) |
|---|---|---|---|---|---|
| Aspheric surface coefficient | κ | −6.8183E−01 | Aspheric surface coefficient | κ | −7.6591E−01 |
| | A4 | −8.4260E−04 | | A4 | −3.8331E−03 |
| | A6 | +3.8389E−03 | | A6 | +9.8719E−04 |
| | A8 | −3.8111E−03 | | A8 | +7.6606E−04 |
| | A10 | −2.2324E−03 | | A10 | +5.7455E−04 |
| | A12 | +1.3407E−03 | | A12 | +1.0389E−04 |
| | A14 | −5.0467E−04 | | A14 | −1.0077E−04 |
| Coefficient of optical path difference function (standard wavelength 690) nm | B2 | +0.0000E+00 | Coefficient of optical path difference function (standard wavelength 655) nm | B2 | −4.1938E−03 |
| | B4 | −5.9411E−03 | | B4 | −1.0046E−02 |
| | B6 | +1.1319E−04 | | B6 | +9.1441E−04 |
| | B8 | −2.9777E−03 | | B8 | +7.1955E−04 |
| | B10 | +2.4564E−04 | | B10 | −1.9595E−04 |

| | | $3^{rd}$ surface ($0 \leq h < 1.016$) | | | $3^{\prime th}$ surface ($1.016 \leq h$) |
|---|---|---|---|---|---|
| Aspheric surface coefficient | κ | −6.3420E+00 | Aspheric surface coefficient | κ | −2.9189E+01 |
| | A4 | −3.6906E−02 | | A4 | +8.6286E−03 |
| | A6 | −1.3750E−02 | | A6 | +2.2935E−03 |
| | A8 | −3.1502E−02 | | A8 | −2.8129E−04 |
| | A10 | +2.1144E−02 | | A10 | −5.4348E−04 |
| | A12 | −3.3970E−03 | | A12 | +4.3988E−05 |
| | A14 | +1.3978E−08 | | A14 | +1.7901E−05 |
| Coefficient of optical path difference function (standard wavelength 690) nm | B2 | +0.0000E+00 | Coefficient of optical path difference function (standard wavelength 655) nm | B2 | +1.7323E−02 |
| | B4 | +0.0000E+00 | | B4 | −4.9102E−03 |
| | B6 | +1.2060E−02 | | B6 | +1.5806E−04 |
| | B8 | +5.5745E−03 | | B8 | −2.2550E−04 |
| | B10 | −5.1216E−03 | | B10 | −2.6994E−05 |

A pitch of diffractive ring-shaped zones is prescribed by the expression wherein coefficients shown in Table 2 are substituted in the optical path difference function of Numeral 2.

Numeral 2
Optical Path Difference Function $$\Phi(h) = \sum_{i=0}^{5} B_{2i} h^{2i}$$

In the expression above, $B_{2i}$ represents a coefficient of the optical path difference function.

Incidentally, "standard wavelength" in Table 2 means the so-called blazed wavelength wherein the diffraction efficiency of diffracted ray in a certain order that is caused by a diffractive structure when a light flux having that wavelength enters becomes the greatest (for example, 100%).

Figure 4:
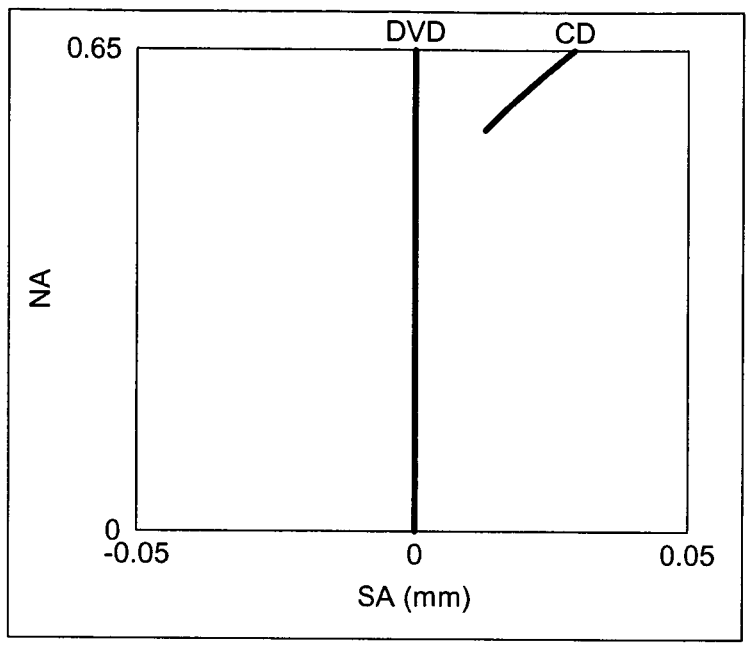
Figure 4:
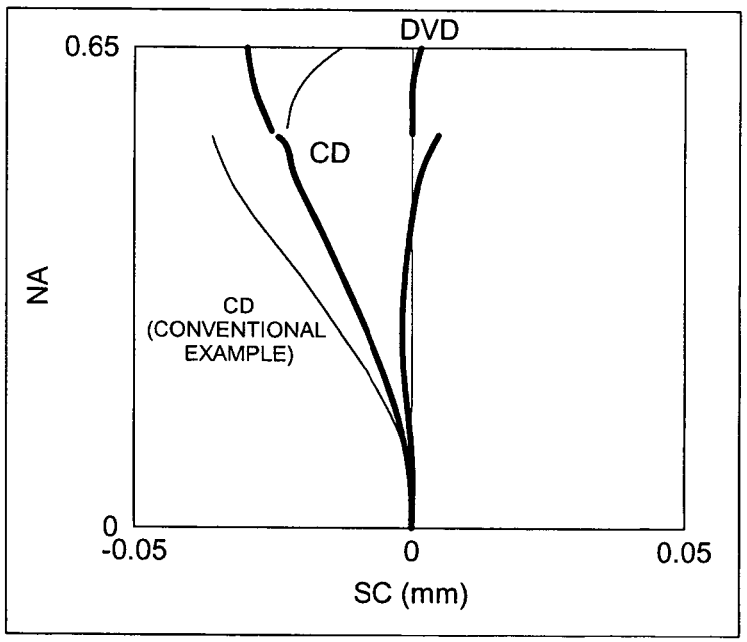

FIG. 4 shows a comparison between an occasion in which the optical pickup device shown in the present example is used and an occasion in which a conventional optical pickup device is used, and FIG. 4(a) shows longitudinal spherical aberration and FIG. 4(b) shows an amount of offense against the sine condition.

Incidentally, as a conventional optical pickup device, there was used an objective lens in which a diffractive structure composed of plural diffractive ring-shaped zones is provided only on the plane of incidence side. Then, there was used one wherein an optical pickup device and an objective lens were designed so that an amount of longitudinal spherical aberration for each of DVD and CD and an amount of offense against the sine condition for DVD may agree with those in the optical pickup device shown in the present example.

Incidentally, a diagram of longitudinal spherical aberration in the case of using a conventional optical pickup device and an amount of offense against the sine condition for DVD are omitted because they are the same as FIG. 4(a) and FIG. 4(b).

It is understood from FIG. 4(b) that an amount of offense against the sine condition for CD is improved by about 30% at the position farthest from an optical axis on the central area, compared with an conventional example.

Figure 5:
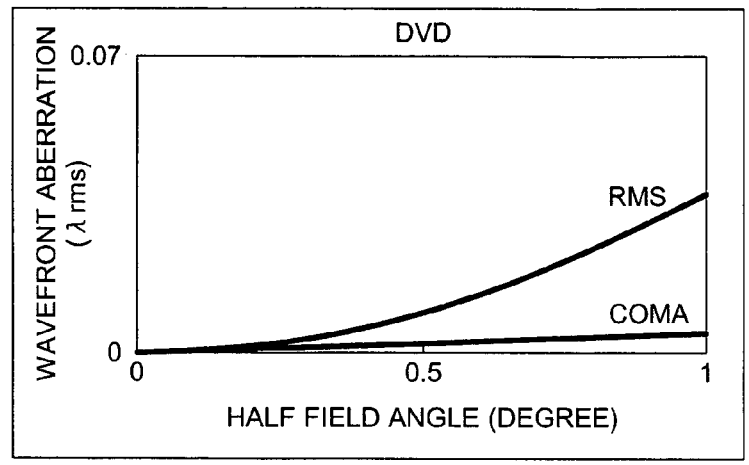
Figure 5:
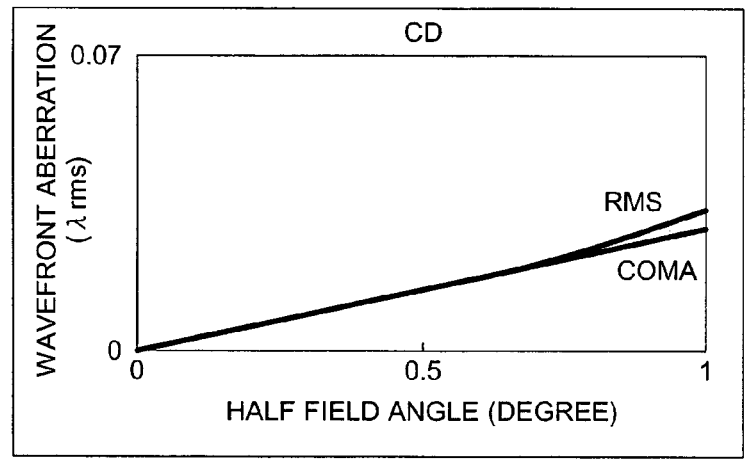
Figure 5:
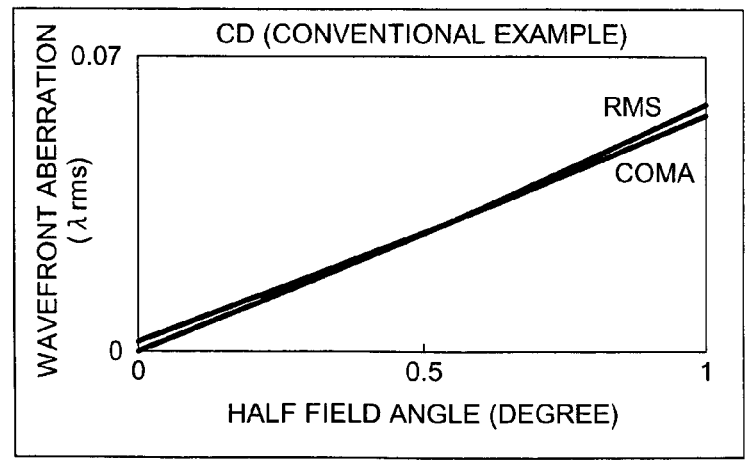

FIG. 5 shows the total wavefront aberration (which is expressed as RMS) and coma (which is expressed as COMA) in the case where a field angle is given to a light flux entering an objective lens, and FIGS. 5(a) and 5(b) are respectively for the occasion where the optical pickup device of the present example is used for DVD and the occasion where the optical pickup device of the present example is used for CD, while, FIG. 5(c) shows the occasion where the conventional optical pickup device is used for CD. Incidentally, when the conventional optical pickup device is used for DVD, the results thereof are the same as in FIG. 5(a), thus, illustration for that is omitted.

FIGS. 5(b) and 5(c) show that coma for CD is improved by about 50%, compared with an conventional example.

From the foregoing, it has been confirmed that compatibility for DVD and CD is sufficient.

EXAMPLE 2

Next, Example 2 for the optical pickup device and the objective lens shown in the above embodiment will be explained.

The optical pickup device of the present example is of the same structure as that of optical pickup device 10 shown in FIG. 1, and it is for compatible use for DVD and CD, and each of a light flux having wavelength λ1 (655 nm) used for DVD and a light flux having wavelength λ2 (790 nm) used for CD enters the objective lens in the form of divergent light in that structure.

An objective lens in the present example also is of the same structure as that in objective lens 40 shown in FIG. 3, and diffractive ring-shaped zones serving as the first diffractive structure are provided a n central area having a height from the optical axis of not more than 1.555 mm on an optical surface (plane of incidence) closer to a light source on the objective lens representing a single lens that is a double-sided aspherical lens and on a peripheral area having a height of not less than 1.555 mm.

Further, diffractive ring-shaped zones serving as the second diffractive structure are provided on a central area having a height from an optical axis of not more than 1.225 mm on an optical surface (plane of emergence) closer to an optical information recording medium side on an objective lens and on a peripheral area having a height of not less than 1.225 mm.

A step surface of the first diffractive structure is arranged to face the optical axis side, and a step surface of the second diffractive structure is arranged to face the side opposite to the optical axis.

Lens data are shown in Tables 3 and 4.

TABLE 3

Example (2)

| | | |
|---|---|---|
| Focal length | $f_1$ = 2.89 mm | $f_2$ = 2.91 mm |
| Numerical aperture | NA1 = 0.60 | NA2 = 0.47 |
| Image forming magnification | m = −0.125 | m = −0.124 |

| $i^{th}$ surface | Ri | di (655 nm) | ni (655 nm) | di (785 nm) | ni (785 nm) | |
|---|---|---|---|---|---|---|
| 0 | | 25.59083 | | 25.95732 | | |
| 1 | ∞ | 0.0 | 1.0 | 0.0 | 1.0 | *1 |
| 2 | 1.88781 | 2.0 | 1.52915 | 2.0 | 1.52530 | *2 |
| 2' | 1.90380 | 0.00380 | — | 0.00380 | — | *2 |
| 3 | −5.07359 | 1.80917 | — | 1.44268 | — | *2 |
| 3' | −5.26911 | 0.0 | 1.0 | 0.0 | 1.0 | *2 |
| 4 | ∞ | 0.6 | 1.57752 | 1.2 | 1.57042 | |
| 5 | ∞ | | | | | |

*1; Aperture diameter 3.846 mm
*2; Aspheric surface · Diffractive interface
*di represents a displacement from $i^{th}$ surface to $(i + 1)^{th}$ surface.
*d2' represents a displacement from $2^{nd}$ surface to $2'^{th}$ surface.
*d3' represents a displacement from $3^{rd}$ surface to $3'^{th}$ surface.

TABLE 4

Aspheric surface · diffractive surface data

| | | $2^{nd}$ surface (0 ≦ h < 1.555 mm) | | | $2'^{th}$ surface (1.555 mm ≦ h) |
|---|---|---|---|---|---|
| Aspheric surface coefficient | κ | −7.7946E−01 | Aspheric surface coefficient | κ | −7.8219E−01 |
| | A4 | +4.9209E−04 | | A4 | −1.1151E−03 |
| | A6 | −1.1015E−03 | | A6 | −5.4096E−04 |
| | A8 | −1.2781E−05 | | A8 | +3.2715E−04 |
| | A10 | −5.0430E−05 | | A10 | −1.8842E−04 |
| | A12 | +1.1698E−05 | | A12 | +3.7295E−05 |
| | A14 | −1.1954E−06 | | A14 | −1.3357E−06 |
| Coefficient of optical path difference function (standard wavelength 700 nm) | B2 | +0.0000E+00 | Coefficient of optical path difference function (standard wavelength 655 nm) | B2 | +5.3615E−04 |
| | B4 | −1.6997E−03 | | B4 | −2.2086E−03 |
| | B6 | −6.5784E−04 | | B6 | −2.7158E−04 |
| | B8 | −1.0623E−04 | | B8 | −1.2282E−04 |
| | B10 | +2.2622E−05 | | B10 | +3.9351E−05 |

| | | $3^{rd}$ surface (0 ≦ h < 1.225) | | | $3'^{th}$ surface (1.2250 ≦ h) |
|---|---|---|---|---|---|
| Aspheric surface | κ | −3.1365E+01 | Aspheric surface | κ | −2.5768E+01 |
| | A4 | −3.9456E−03 | | A4 | −5.8128E−03 |

TABLE 4-continued

Aspheric surface · diffractive surface data

| | | | | | |
|---|---|---|---|---|---|
| coefficient | A6 | −2.1722E−03 | coefficient | A6 | −5.8602E−04 |
| | A8 | +4.1516E−04 | | A8 | +4.2130E−04 |
| | A10 | +1.8942E−04 | | A10 | +2.1962E−04 |
| | A12 | −6.4818E−05 | | A12 | −5.9848E−05 |
| | A14 | +2.0156E−06 | | A14 | +5.9769E−07 |
| Coefficient of optical path difference function (standard wavelength 730 nm) | B2 | +0.0000E+00 | Coefficient of optical path difference function (standard wavelength 655 nm) | B2 | +1.0251E−03 |
| | B4 | +1.1341E−03 | | B4 | +1.1873E−03 |
| | B6 | +5.8766E−03 | | B6 | +5.0223E−03 |
| | B8 | −2.5160E−03 | | B8 | −2.4544E−03 |
| | B10 | +3.6224E−04 | | B10 | +3.1505E−04 |

As shown in Table 3, the objective lens of the present example is established to have focal length $f_1$=2.89 mm, image-side numerical aperture NA1=0.60 and image forming magnification m=−0.125 when first wavelength λ1 emitted from the first light source is 655 nm, and to have focal length $f_2$=2.91 mm, image-side numerical aperture NA2=0.47 and image forming magnification m=−0.124 when second wavelength λ2 emitted from the second light source is 790 nm.

Surface numbers 2 and 2' in Table 3 express respectively a central area having a height from an optical axis of not more than 1.555 mm on a plane of incidence of the objective lens and a peripheral area having a height from an optical axis of not less than 1.555 mm, surface numbers 3 and 3' express respectively a central area having a height from an optical axis of not more than 1.225 mm on a plane of emergence of the objective lens and a peripheral area having a height from an optical axis of not less than 1.225 mm and surface numbers 4 and 5 express respectively a surface of a protective base board and an information recording surface of an optical information recording medium. Further, Ri represents a radius of curvature, di represents an amount of displacement from $i^{th}$ surface to $(i+1)^{th}$ surface in the direction of optical axis L, and ni represents a refractive index of each surface.

Each of $2^{nd}$ surface, $2'^{th}$ surface, $3^{rd}$ surface and $3'^{th}$ surface of the objective lens is formed to be an aspheric surface which is prescribed by the expression wherein coefficients shown in Table 3 and Table 4 are substituted in Numeral 1 and is axially symmetric about optical axis L.

Further, a pitch of diffractive ring-shaped zones is prescribed by an expression wherein coefficients shown in Table 4 are substituted in the optical path difference function of Numeral 2.

Figure 6:
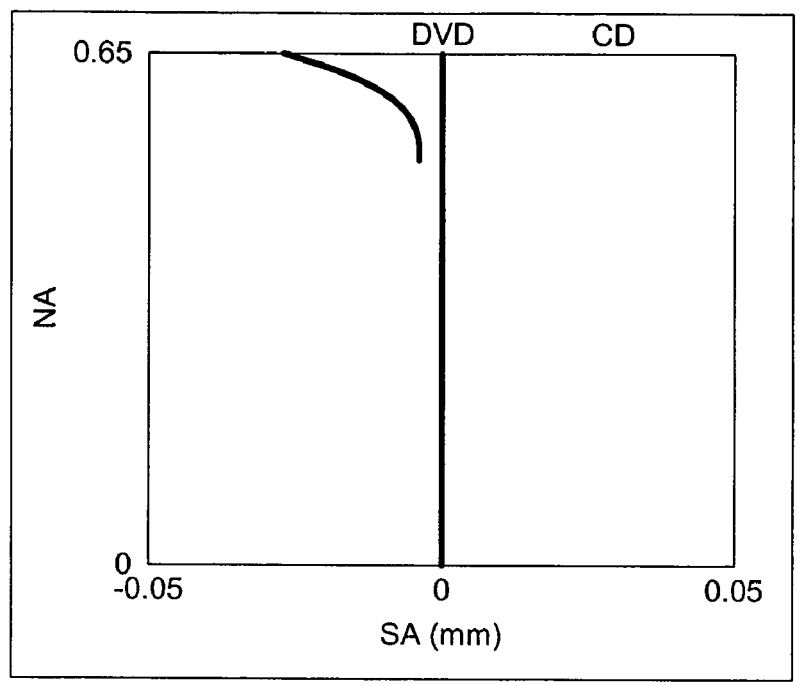
Figure 6:
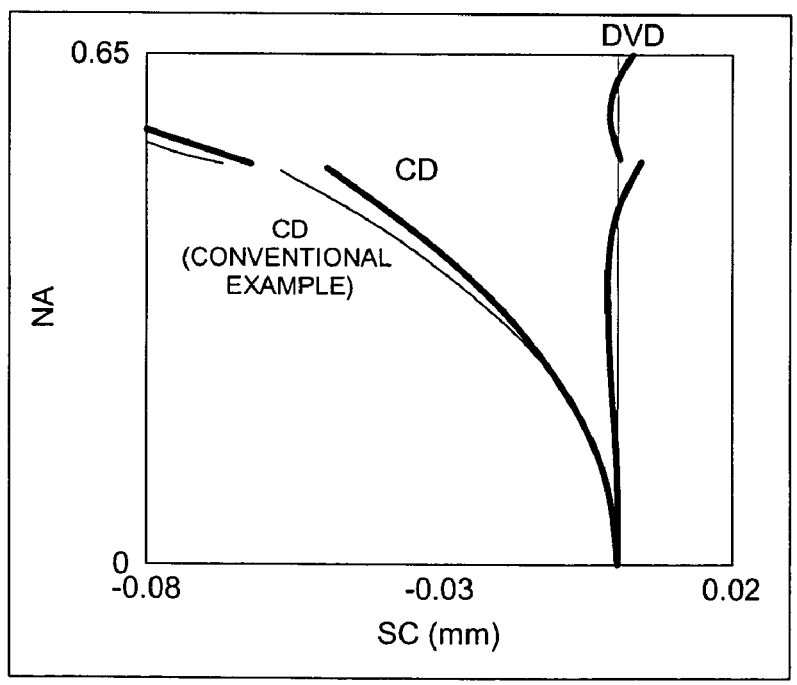

FIG. 6 shows a comparison between an occasion in which the optical pickup device shown in the present example is used and an occasion in which a conventional optical pickup device is used, and FIG. 6(*a*) shows longitudinal spherical aberration and FIG. 6(*b*) shows an amount of offense against the sine condition.

Incidentally, as a conventional optical pickup device, there was used an objective lens in which a diffractive structure composed of plural diffractive ring-shaped zones is provided only on the plane of incidence side. Then, there was used one wherein an optical pickup device and an objective lens were designed so that an amount of longitudinal spherical aberration for each of DVD and CD and an amount of offense against the sine condition for DVD may agree with those in the optical pickup device shown in the present example.

Incidentally, a diagram of longitudinal spherical aberration in the case of using a conventional optical pickup device and an amount of offense against the sine condition for DVD are omitted because they are the same as FIGS. 6(a) and 6(b).

It is understood from FIG. 6(b) that an amount of offense against the sine condition for CD is improved by about 50% at the position farthest from an optical axis on the central area, compared with an conventional example.

Figure 7:
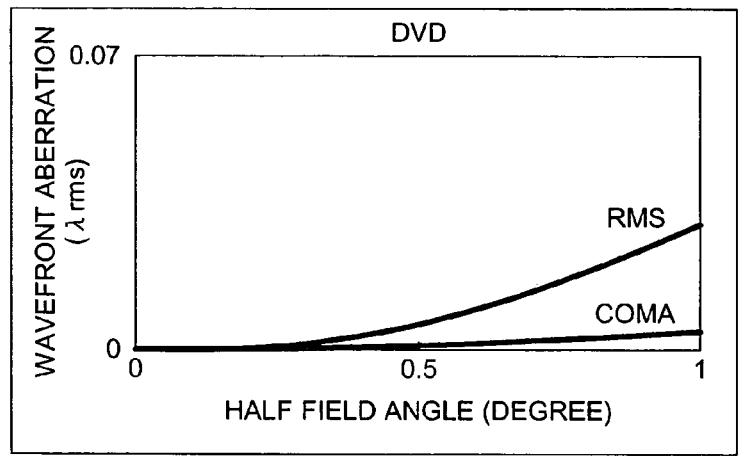
Figure 7:
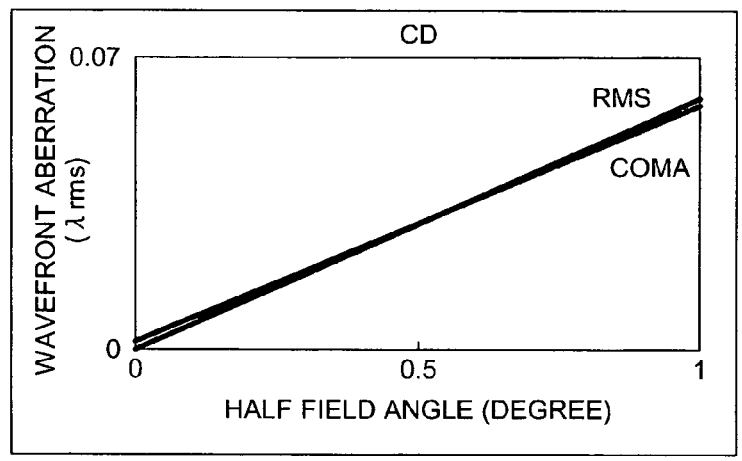
Figure 7:
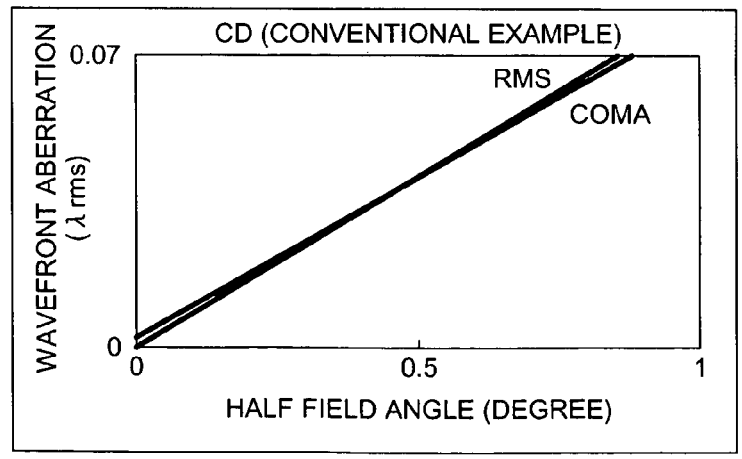

FIG. 7 shows the total wavefront aberration (which is expressed as RMS) and coma (which is expressed as COMA) in the case where a field angle is given to a light flux entering an objective lens, and FIGS. 7(a) and 7(b) are respectively for the occasion where the optical pickup device of the present example is used for DVD and the occasion where the optical pickup device of the present example is used for CD, while, FIG. 7(c) shows the occasion where the conventional optical pickup device is used for CD. Incidentally, when the conventional optical pickup device is used for DVD, the results thereof are the same as in FIG. 7(a), thus, illustration for that is omitted.

FIGS. 7(b) and 7(c) show that coma for CD is improved by about 70%, compared with an conventional example.

From the foregoing, it has been confirmed that compatibility for DVD and CD is sufficient.

EXAMPLE 3

Next, Example 3 for the optical pickup device and the objective lens shown in the above embodiment will be explained.

The optical pickup device of the present example is for compatibility between DVD and CD, and its structure, a light flux having wavelength $\lambda 1$ (655 nm) used for DVD enter the objective lens as infinite light and a light flux having wavelength $\lambda 2$ (785 nm) used for CD enters the objective lens in the form of divergent light.

An objective lens in the present example also is of the same structure as that in objective lens 40 shown in FIG. 3, and diffractive ring-shaped zones serving as the first diffractive structure are provided on a central area having a height from the optical axis of not more than 1.115 mm on an optical surface (plane of incidence) closer to a light source on the objective lens representing a single lens that is a double-sided aspherical lens and on a peripheral area having a height of not less than 1.115 mm.

Further, diffractive ring-shaped zones serving as the second diffractive structure are provided on a central area having a height from an optical axis of not more than 0.914 mm on an optical surface (plane of emergence) closer to an optical information recording medium side on an objective lens and on a peripheral area having a height of not less than 0.914 mm.

A step surface of the first diffractive structure is arranged to face the optical axis side, and a step surface of the second diffractive structure is arranged to face the side opposite to the optical axis.

Lens data are shown on Tables 5 and 6.

TABLE 5

Example (3)

| | | |
|---|---|---|
| Focal length | $f_1$ = 2.33 mm | $f_2$ = 2.35 mm |
| Numerical aperture | NA1 = 0.60 | NA2 = 0.47 |
| Image forming magnification | m = 0.0 | m = −0.073 |

| $i^{th}$ surface | Ri | di (655 nm) | ni (655 nm) | di (785 nm) | ni (785 nm) | |
|---|---|---|---|---|---|---|
| 0 | ∞ | | | 34.27761 | | |
| 1 | ∞ | 0.0 | 1.0 | 0.0 | 1.0 | *1 |
| 2 | 1.42044 | 1.2 | 1.52915 | 1.2 | 1.52541 | *2 |
| 2' | 1.39814 | 0.0 | — | 0.0 | — | *2 |
| 3 | −6.59885 | 1.268655 | — | 1.069993 | — | *2 |
| 3' | −6.34101 | 0.0 | 1.0 | 0.0 | 1.0 | *2 |
| 4 | ∞ | 0.6 | 1.57752 | 1.2 | 1.57063 | |
| 5 | ∞ | | | | | |

*1; Aperture diameter 2.796 mm
*2; Aspheric surface · Diffractive interface
*di represents a displacement from $i^{th}$ surface to $(i + 1)^{th}$ surface.
*d2' represents a displacement from $2^{nd}$ surface to $2'^{th}$ surface.
*d3' represents a displacement from $3^{rd}$ surface to $3'^{th}$ surface.

TABLE 6

Aspheric surface · diffractive surface data

| $2^{nd}$ surface ($0 \leq h < 1.115$ mm) | | | $2'^{th}$ surface ($1.115$ mm $\leq h$) | | |
|---|---|---|---|---|---|
| Aspheric surface coefficient | κ | −1.8272E+00 | Aspheric surface coefficient | κ | −6.4865E−01 |
| | A4 | +5.2127E−02 | | A4 | −8.4530E−03 |
| | A6 | −3.1414E−03 | | A6 | −5.6292E−03 |
| | A8 | −1.9576E−04 | | A8 | +5.5440E−03 |
| | A10 | −1.8904E−03 | | A10 | +2.2911E−03 |
| | | | | A12 | −1.6823E−03 |
| | | | | A14 | −7.5870E−04 |
| | | | | A16 | +4.34269E−04 |
| Coefficient of optical path difference function (standard wavelength 720 nm) | B2 | +0.0000E+00 | Coefficient of optical path difference function (standard wavelength 655 nm) | B2 | +1.1855E−02 |
| | B4 | −2.7721E−03 | | B4 | −3.3821E−02 |
| | B6 | +1.4881E−04 | | B6 | −2.4167E−02 |
| | B8 | −1.4305E−03 | | B8 | −8.9817E−03 |
| | B10 | +4.1210E−04 | | B10 | +1.5806E−03 |

| $3^{rd}$ surface ($0 \leq h < 0.914$) | | | $3'^{th}$ surface ($0.914 \leq h$) | | |
|---|---|---|---|---|---|
| Aspheric surface coefficient | κ | +1.3491E+01 | Aspheric surface coefficient | κ | +1.6472E+01 |
| | A4 | +2.4348E−02 | | A4 | +2.3862E−02 |
| | A6 | +1.5289E−02 | | A6 | +4.6342E−02 |
| | A8 | −2.3893E−02 | | A8 | −1.6092E−02 |
| | A10 | +1.5674E−02 | | A10 | +1.7476E−02 |
| | A12 | −3.9357E−03 | | A12 | −6.8798E−03 |
| | A14 | +6.3418E−04 | | A14 | +1.2840E−03 |
| Coefficient of optical path difference function (standard wavelength 690 nm) | B2 | +0.0000E+00 | Coefficient of optical path difference function (standard wavelength 655 nm) | B2 | +0.0000E+00 |
| | B4 | +5.9581E−03 | | B4 | +1.5385E−02 |
| | B6 | +2.5040E−03 | | B6 | −5.2268E−03 |
| | B8 | +4.4997E−03 | | B8 | −3.0123E−03 |
| | B10 | −2.2861E−03 | | B10 | +7.5387E−04 |

As shown in Table 5, the objective lens of the present example is established to have focal length $f_1$=2.33 mm, image-side numerical aperture NA1=0.60 and image forming magnification m=0.0 when first wavelength $\lambda 1$ emitted from the first light source is 655 nm, and to have focal length $f_2$=2.35 mm, image-side numerical aperture NA2=0.47 and image forming magnification m=−0.073 when second wavelength $\lambda 2$ emitted from the second light source is 785 nm.

Surface numbers 2 and 2' in Table 5 express respectively a central area having a height from an optical axis of not more than 1.115 mm on a plane of incidence of the objective lens and a peripheral area having a height from an optical axis of not less than 1.115 mm, surface numbers 3 and 3' express respectively a central area having a height from an optical axis of not more than 0.9141 mm on a plane of emergence of the objective lens and a peripheral area having a height from an optical axis of not less than 0.914 mm and surface numbers 4 and 5 express respectively a surface of a protective base board and an information recording surface of an optical information recording medium. Further, Ri represents a radius of curvature, di represents an amount of displacement from $i^{th}$ surface to $(i+1)^{th}$ surface in the direction of optical axis L, and ni represents a refractive index of each surface.

Each of $2^{nd}$ surface, $2^{'th}$ surface, $3^{rd}$ surface and $3^{'th}$ surface of the objective lens is formed to be an aspheric surface which is prescribed by the expression wherein coefficients shown in Table 5 and Table 6 are substituted in Numeral 1 and is axially symmetric about optical axis L.

Further, a pitch of diffractive ring-shaped zones is prescribed by an expression wherein coefficients shown in Table 6 are substituted in the optical path difference function of Numeral 2.

Figure 8:
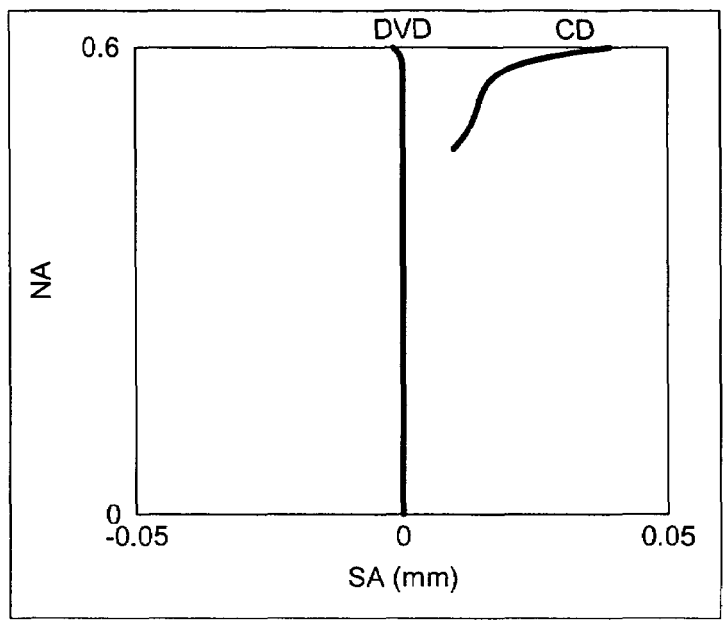
Figure 8:
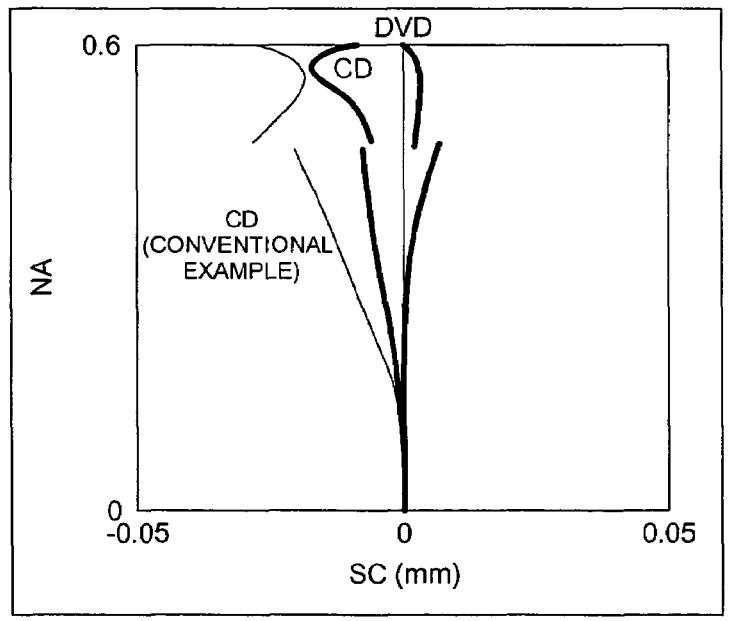

FIG. 8 shows a comparison between an occasion in which the optical pickup device shown in the present example is used and an occasion in which a conventional optical pickup device is used, and FIG. 8($a$) shows longitudinal spherical aberration and FIG. 8($b$) shows an amount of offense against the sine condition.

Incidentally, as a conventional optical pickup device, there was used an objective lens in which a diffractive structure composed of plural diffractive ring-shaped zones is provided only on the plane of incidence side. Then, there was used one wherein an optical pickup device and an objective lens were designed so that an amount of longitudinal spherical aberration for each of DVD and CD and an amount of offense against the sine condition for DVD may agree with those in the optical pickup device shown in the present example.

Incidentally, a diagram of longitudinal spherical aberration in the case of using a conventional optical pickup device and an amount of offense against the sine condition for DVD are omitted because they are the same as FIGS. 8($a$) and 8($b$).

It is understood from FIG. 8($b$) that an amount of offense against the sine condition for CD is improved by about 20% at the position farthest from an optical axis on the central area, compared with an conventional example.

Figure 9:
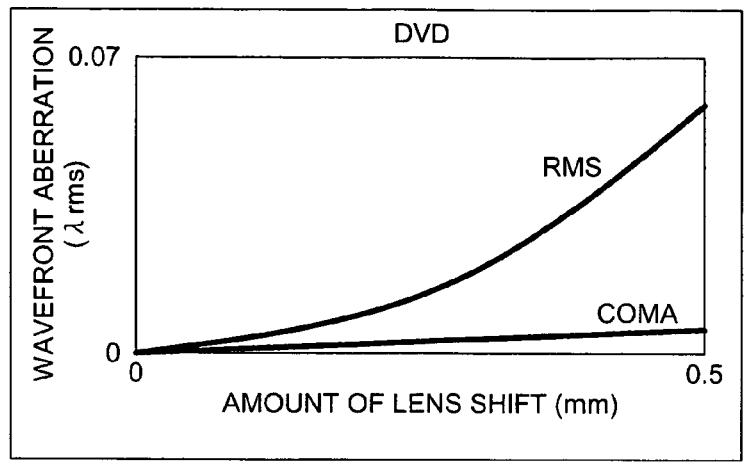
Figure 9:
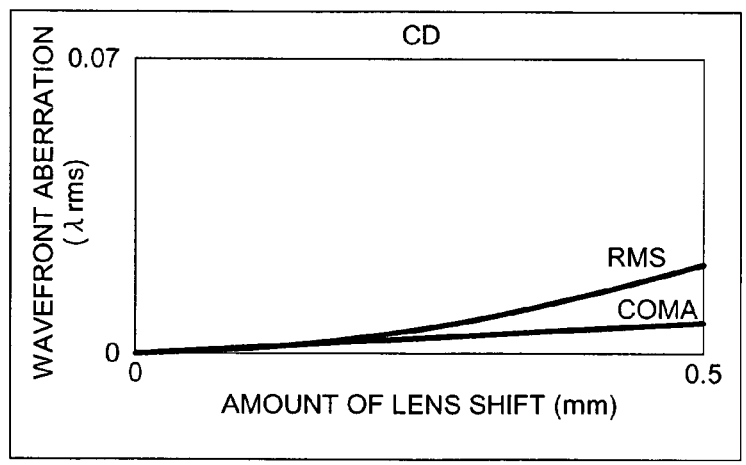
Figure 9:
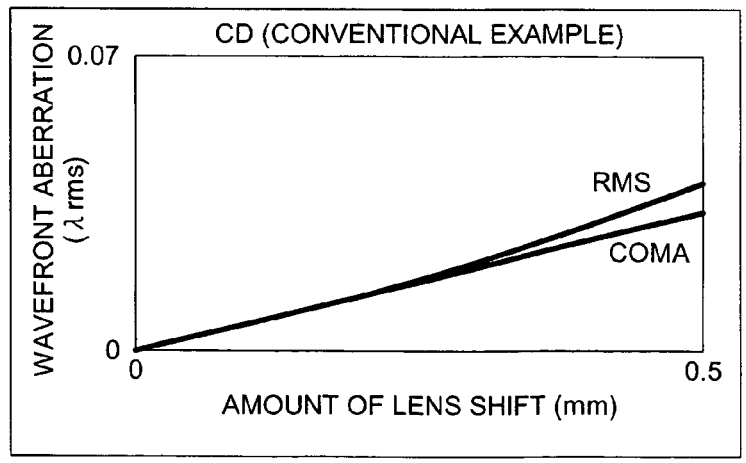

FIG. 9 shows the total wavefront aberration (which is expressed as RMS) and coma (which is expressed as COMA) in the case where a field angle is given to a light flux entering an objective lens, and FIGS. 9($a$) and 9($b$) are respectively for the occasion where the optical pickup device of the present example is used for DVD and the occasion where the optical pickup device of the present example is used for CD, while, FIG. 9($c$) shows the occasion where the conventional optical pickup device is used for CD. Incidentally, when the conventional optical pickup device is used for DVD, the results thereof are the same as in FIG. 9($a$), thus, illustration for that is omitted.

FIGS. 9($b$) and 9($c$) show that coma for CD is improved by about 30%, compared with an conventional example.

From the foregoing, it has been confirmed that compatibility for DVD and CD is sufficient.

Incidentally, in the present embodiment, the step surface 62 of the first diffractive ring-shaped zones 60 is arranged to face the optical axis L side, while, the step surface 72 of the second diffractive ring-shaped zones 70 is arranged to face the side opposite to the optical axis L. However, it is also possible to obtain objective lens 40 and optical pickup device 10 both relating to the invention, even when forming the first diffractive structure 60 and the second diffractive structure 70 in a way that $\phi'(h)<0$ is satisfied for the first diffractive ring-shaped zones 60 and $\phi'(h)>0$ is satisfied for the second diffractive ring-shaped zones 70 when an amount of addition of optical path difference for each light flux by each of the first diffractive structure 60 and the second diffractive structure 70 is expressed by the differential coefficient $\phi'(h)(2B_2h + 4B_4h^3 + 6B_6h^5 + \ldots nB_nh^{(n-1)})$ of the optical path difference function shown in Numeral 2 above.

Further, in the foregoing, the first optical surface 41 is provided with two areas including central area A1 and peripheral area A2 and the second optical surface 42 is provided with two areas including central area B1 and peripheral area B2. However, it is also possible to arrange so that none of the first and second optical surfaces 41 and 42 is provided with these two areas. Or, it is possible to arrange so that either one of the first optical surface 41 and the second optical surface 42 alone is provided with these two areas.

Further, the first diffractive structure 60 and the second diffractive structure 70 have only to be formed on a plane of incidence and a plane of emergence of objective optical element 40.

In the invention, a difference between an amount of offense against the sine condition for a light flux having the first wavelength and an amount of offense against the sine condition for a light flux having the second wavelength is corrected spherical aberration is corrected excessively by diffracting actions given by the first diffractive structure on the first optical surface, for a light flux having the second wavelength $\lambda 2$, for example, and diffracting actions which are opposite to those by the first diffractive structure are given to a light flux having wavelength $\lambda 2$ by the second diffractive structure on the second optical surface, and excessive amount of correction for spherical aberration is corrected to be in the appropriate state, thus, occurrence of coma and astigmatism in the case of image height caused by tracking or the like can be corrected for two types of optical information recording media.

What is claimed is:

1. An objective optical element for use in an optical pickup apparatus for conducting, reproducing, and/or recording information by converging a light flux of a first wavelength $\lambda 1$ emitted from a first light source onto a first optical information recording medium having a protective substrate thickness t1 and by converging a light flux of a second wavelength $\lambda 2$ emitted from a second light source onto a second optical information recording medium having a protective substrate thickness t2, wherein $\lambda 2$ is greater than $\lambda 1$ and t2 is greater than or equal to t1, comprising: a first optical surface including a first diffractive structure which comprises a plurality of concentric ring-shaped diffractive zones having stepped surfaces arranged to be almost parallel to the optical axis and connecting respective neighboring ring-shaped diffractive zones; and a second optical surface including a second diffractive structure which comprises a plurality of concentric ring-shaped diffractive zones having stepped surfaces arranged to be almost parallel to the optical axis and connecting respective neighboring ring-shaped diffractive zones; wherein each of the first and second optical surfaces has a center located on an optical axis and a periphery located far from the optical axis, wherein exterior surfaces of the stepped surfaces of the first diffractive structure are arranged to face the center, and exterior surfaces of the stepped surfaces of the second diffractive structure are arranged to face the periphery, wherein the first diffractive structure applies diffracting actions for the light flux of the first wavelength $\lambda 1$ and the light flux of the second wavelength $\lambda 2$, respectively, when the light flux of the first wavelength $\lambda 1$ and the light flux of the second wavelength $\lambda 2$ pass through the first diffractive structure, wherein the second diffractive structure applies diffracting actions for the light flux of the first wavelength λ1 and the light flux of the second wavelength λ2, respectively, when the light flux of the first wavelength λ1 and the light flux of the second wavelength λ2 pass through the second diffractive structure, the diffractive actions applied to one of the light flux of the first wavelength λ1 and the light flux of the second wavelength λ2 by the second diffractive structure are opposite to the diffractive actions applied to the one of the light flux of the first wavelength λ1 and the light flux of the second wavelength λ2 by the first diffractive structure.

2. The objective optical element of claim 1, wherein when an added length of an optical path of each light flux by the first and second diffractive structure is represented by a differential function φ(h) of an optical path difference function φ(h) in which an optical path difference function φ(h) is defined by the formula of $\phi(h)=(B_2^2+B_4^4+\ldots B_n h^n)$ and the differential function φ'(h) is represented by the formula of $\phi'(h)=(2B_2h+4B_4h^3+6B_6h^5+\ldots nB_n h^{(n-1)})$ where h is a height from the optical axis and Bn is a coefficient of n-th order optical path difference function (n is an even number), the following formulas are satisfied:

with regard to the first diffractive structure, $\phi'(h)<0$, and with regard to the second diffractive structure, $\phi'(h)>0$.

3. The objective optical element of claim 1, wherein at least one of the first optical surface and the second optical surface includes at least two concentric regions of a central region and a peripheral region located at the outside of the central region, and wherein a light flux having passed through the central region is used for conducting reproducing and/or recording information for the first and second information recording mediums and a light flux having passed through the peripheral region is used for conducting reproducing and/or recording information mainly for the first information recording medium.

4. The objective optical element of claim 3, wherein the objective lens comprises the central region and the peripheral region on the first optical surface and the first diffractive structure is provided on the central region.

5. The objective optical element of claim 3, wherein the objective lens comprises the central region and the peripheral region on the second optical surface and the second diffractive structure is provided on the central region.

6. The objective optical element of claim 3, wherein the objective lens comprises the central region and the peripheral region on both of the first and second optical surfaces.

7. The objective optical element of claim 6, wherein the first diffractive structure is provided on the central region of the first surface and the second diffractive structure is provided on the central region of the second surface.

8. The objective optical element of claim 7, wherein when a sine condition offence amount is defined by the formula of (OSC(h)=h/sin u'−f1), where h is a height from the optical axis at an arbitral position on the central region, h max is a height from the optical axis at a position on the central region located farthest from the optical axis, u' is an angle formed between a light flux having passed through the height of h and the optical axis, fi is a focal length for a light flux of a first wavelength λ1, the sine condition offence amount OSC with regard to a light flux of the first wavelength λ1 passing through the central region satisfies the following formulas:

OSC(h max/2)<0, and

OSC(h max/2)<OSC(h max).

9. The objective optical element of claim 1, wherein the first optical surface is arranged at a light source side of the optical pickup apparatus, and the second optical surface is arranged at an optical information recording medium side.

10. The objective optical element of claim 1, wherein the following formula is satisfied:

0.25≦L2/L1≦0.85 where L1 is the number of the ring-shaped diffractive zones of the first diffractive structure and L2 is the number of the ring-shaped diffractive zones of the second diffractive structure.

11. The objective optical element of claim 1, wherein the first wavelength λ1 and the second wavelength λ2 satisfy the following formulas:

600 nm≦λ1≦700 nm 750 nm≦λ2≦850 nm.

12. The objective optical element of claim 1, wherein the following formula is satisfied:

m1=m2=0 where m1 is an image forming magnification for a light flux of the first wavelength λ1 and m2 is an image forming magnification for a light flux of the second wavelength λ2.

13. The objective optical element of claim 1, wherein the following formula is satisfied:

m1>m2 where m1 is an image forming magnification for a light flux of the first wavelength λ1 and m2 is an image forming magnification for a light flux of the second wavelength λ2.

14. The objective optical element of claim 13, wherein the following formula is satisfied:

m1=0 where m1 is an image forming magnification for a light flux of the first wavelength λ1 and m2 is an image forming magnification for a light flux of the second wavelength λ2.

15. The objective optical element of claim 1, wherein the following formula is satisfied:

(m1−0.01)<m2<(m1+0.01)<0 where m1 is an image forming magnification for a light flux of the first wavelength λ1 and m2 is an image forming magnification for a light flux of the second wavelength λ2.

16. The objective optical element of claim 13, wherein the following formula is satisfied:

−0.295≦m1≦−0.049.

17. An optical pickup apparatus for conducting reproducing and/or recording information by converging a light flux of a first wavelength λ1 emitted from a first light source onto a first optical information recording medium having protective substrate thickness t1 and by converging a light flux of a wavelength λ2 (λ2>λ1) emitted from a second light source onto a second optical information recording medium having a protective substrate thickness t2 (t2≧t1), comprising:

the objective optical element described in claim 1.

18. The objective optical element of claim 1, wherein the objective optical element includes a light source side into which a light flux emitted from the first and second light sources enters and an optical information recording medium side from which a light flux is converged onto the first and second optical information recording mediums, and wherein the first optical surface is provided on the light source side and the second optical surface is provided on the optical information recording medium side.

19. The objective optical element of claim 1, wherein the one of the light flux of the first wavelength λ1 and the light flux of the second wavelength λ2 is the light flux of the second wavelength λ2.

20. The objective optical element of claim 19, wherein excessive correction in a spherical aberration of the light flux of the second wavelength λ2 is corrected by the first diffractive structure, and excessive correction in a spherical aberration of the light flux of the first wavelength λ1 is corrected by the second diffractive structure.

21. The objective optical element of claim 1, wherein a light flux having passed through the peripheral region is not used for conducting reproducing and/or recording information for the second information recording medium.

* * * * *